United States Patent
Maeda et al.

(10) Patent No.: US 10,409,686 B2
(45) Date of Patent: Sep. 10, 2019

(54) APPARATUS AND METHOD TO DETERMINE PLURAL LOCATIONS IN COMMUNICATION CIRCUITS AT WHICH FAILURES HAVE OCCURRED

(71) Applicant: FUJITSU LIMITED, Kawasaki-shi, Kanagawa (JP)

(72) Inventors: Masazumi Maeda, Yokohama (JP); Koji Migita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/792,868

(22) Filed: Oct. 25, 2017

(65) Prior Publication Data
US 2018/0137008 A1 May 17, 2018

(30) Foreign Application Priority Data

Nov. 16, 2016 (JP) ................. 2016-222987

(51) Int. Cl.
| | | |
|---|---|---|
| G06F 11/14 | (2006.01) | |
| G06F 11/22 | (2006.01) | |
| H04L 12/939 | (2013.01) | |
| H04L 12/933 | (2013.01) | |

(52) U.S. Cl.
CPC .......... *G06F 11/1423* (2013.01); *G06F 11/22* (2013.01); *H04L 49/1515* (2013.01); *H04L 49/552* (2013.01); *H04L 49/555* (2013.01); *H04L 49/557* (2013.01); *G06F 2201/85* (2013.01)

(58) Field of Classification Search
CPC . H04L 49/555; H04L 49/557; H04L 49/1515; H04L 49/552; H04L 12/939; G06F 11/1423; G06F 11/22; G06F 2201/85; G06F 11/14

USPC .................................. 370/248, 254
See application file for complete search history.

(56) References Cited

U.S. PATENT DOCUMENTS

| | | | | |
|---|---|---|---|---|
| 4,394,541 A | * | 7/1983 | Seiden ..................... | H04Q 3/68 340/2.22 |
| 4,725,835 A | * | 2/1988 | Schreiner ............... | H04Q 11/04 340/2.2 |
| 4,975,909 A | * | 12/1990 | Masson ............... | H04L 12/1886 370/422 |

(Continued)

FOREIGN PATENT DOCUMENTS

| | | |
|---|---|---|
| JP | 5-207011 | 8/1993 |
| JP | 6-245236 | 9/1994 |

*Primary Examiner* — Man U Phan
(74) *Attorney, Agent, or Firm* — Staas & Halsey LLP

(57) ABSTRACT

An apparatus includes first and second circuits that transmit and receive information to and from each other through first paths, where each of the first and second circuits includes second paths respectively coupled to the first paths, and matrix switches that are provided across the second paths and switch a transmission path of information transmitted to any one of the second paths. Upon detecting an error in the second paths, the apparatus conducts a loop-back test in which each matrix switch is switched to a loop-back state in which information to be transmitted to the second path in which the error has been detected, is looped back. Upon detecting an error in the loop-back test, the apparatus switches the matrix switches to a bypass state in which the second path in which the error is detected is bypassed to another one of the second paths to continue the loop-back test.

7 Claims, 20 Drawing Sheets

(56) References Cited

U.S. PATENT DOCUMENTS

| | | | | |
|---|---|---|---|---|
| 5,287,491 A | * | 2/1994 | Hsu | H04L 12/5601 340/2.23 |
| 5,303,383 A | * | 4/1994 | Neches | G01J 3/06 370/351 |
| 5,321,813 A | * | 6/1994 | McMillen | G01J 3/06 370/244 |
| 5,522,046 A | * | 5/1996 | McMillen | G01J 3/06 370/217 |
| 5,872,904 A | * | 2/1999 | McMillen | G01J 3/06 370/217 |
| 6,243,361 B1 | * | 6/2001 | McMillen | G01J 3/06 370/254 |
| 7,058,084 B2 | * | 6/2006 | McMillen | G01J 3/06 370/464 |
| 7,388,872 B2 | * | 6/2008 | Montgomery, Jr. | H04J 3/085 370/404 |
| 7,706,361 B2 | * | 4/2010 | McMillen | G01J 3/06 370/386 |

* cited by examiner

FIG. 5

| ADDRESS AD [16-BITS] | | DATA DT [64-BITS] | | | | | | | | (HEXADECIMAL) |
|---|---|---|---|---|---|---|---|---|---|---|
| | | "D" | | "C" | | "B" | | "A" | | |
| CHANNEL | MSW | CHANNEL OF CONNECTION DESTINATION | TERMINAL OF CONNECTION DESTINATION | CHANNEL OF CONNECTION DESTINATION | TERMINAL OF CONNECTION DESTINATION | CHANNEL OF CONNECTION DESTINATION | TERMINAL OF CONNECTION DESTINATION | CHANNEL OF CONNECTION DESTINATION | TERMINAL OF CONNECTION DESTINATION | |
| 01 | 01 | 01 | 0B | 01 | 0A | 01 | 0D | 01 | 0C | 1 |
| 01 | 02 | 01 | 0B | 01 | 0A | 01 | 0D | 01 | 0C | 2 |
| 01 | 03 | 01 | 0B | 00 | 00 | 01 | 0A | 02 | 0C | 3 |
| 01 | 04 | 00 | 00 | 00 | 00 | 02 | 0A | 00 | 00 | 4 |
| 01 | 05 | 00 | 00 | 00 | 00 | 00 | 00 | 00 | 00 | 5 |
| 01 | 06 | 00 | 00 | 00 | 00 | 00 | 00 | 00 | 00 | 6 |
| 02 | 01 | 00 | 00 | 01 | 0A | 00 | 00 | 00 | 0B | 7 |
| 02 | 02 | 00 | 00 | 00 | 00 | 00 | 00 | 01 | 0B | 8 |
| 02 | 03 | 00 | 00 | 00 | 00 | 00 | 00 | 00 | 00 | 9 |
| 02 | 04 | 00 | 00 | 00 | 00 | 00 | 00 | 00 | 00 | 10 |
| 02 | 05 | ... | ... | ... | ... | ... | ... | ... | ... | 11 |
| 02 | 06 | ... | ... | ... | ... | ... | ... | ... | ... | 12 |
| ... | ... | | | | | | | | | ... |
| 08 | 01 | 08 | 0B | 08 | 0A | 08 | 0D | 08 | 0C | |
| 08 | 02 | 08 | 0B | 08 | 0A | 08 | 0D | 08 | 0C | |
| 08 | 03 | 08 | 0B | 08 | 0A | 08 | 0D | 08 | 0C | |
| 08 | 04 | 08 | 0B | 08 | 0A | 08 | 0D | 08 | 0C | |
| 08 | 05 | 08 | 0B | 08 | 0A | 08 | 0D | 08 | 0C | |
| 08 | 06 | 08 | 0B | 08 | 0A | 08 | 0D | 08 | 0C | |

FIG. 6

| TEST PATTERN | CPU1 | MSW1 | MSW2 | MSW3 | (TP) | MSW4 | MSW5 | MSW6 | CPU2 | |
|---|---|---|---|---|---|---|---|---|---|---|
| 1 | | ↷ | | | | | | | | PASSED |
| 2 | | ⇅ | ↷ | | | | | | | PASSED |
| 3 | | ⇅ | ⇅ | ↷ | | | | | | PASSED |
| 4 | | ⇅ | ⇅ | ⇅ | ⇅ | ↷ | | | | FAILED → REROUTE OUTWARD PATH (FIG. 7A) |
| 5 | | ⇅ | ⇅ | ⇅ | ⇅ | ⇅ | ↷ | | | FAILED (FIG. 7B) → REROUTE OUTWARD PATH (FIG. 7C) |
| 6 | | ⇅ | ⇅ | ⇅ | ⇅ | ⇅ | ⇅ | ↷ | | PASSED (FIG. 8A) |
| 7 | | ⇅ | ⇅ | ⇅ | ⇅ | ⇅ | ⇅ | ⇅ | ↷ | PASSED (FIG. 8B) |

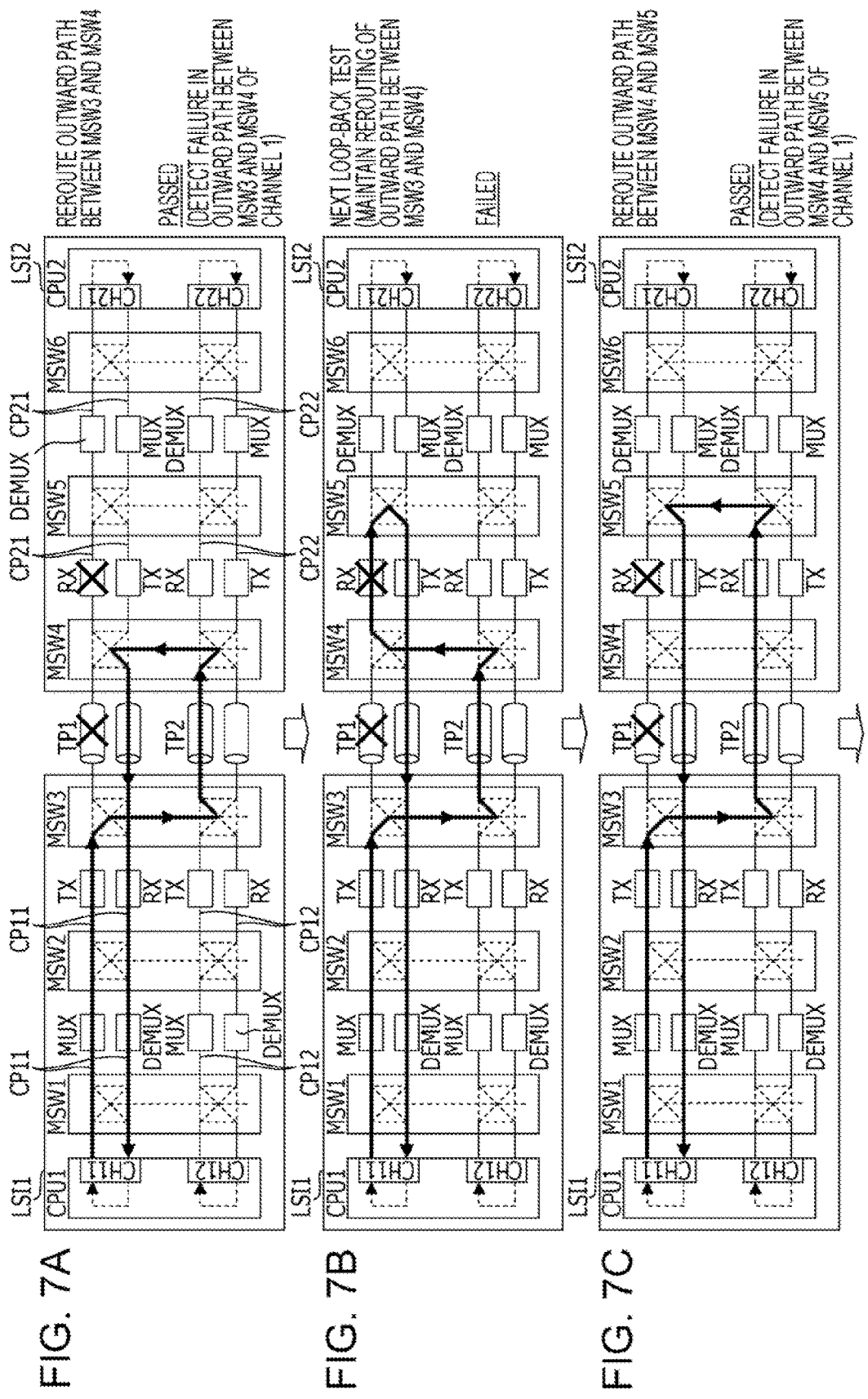

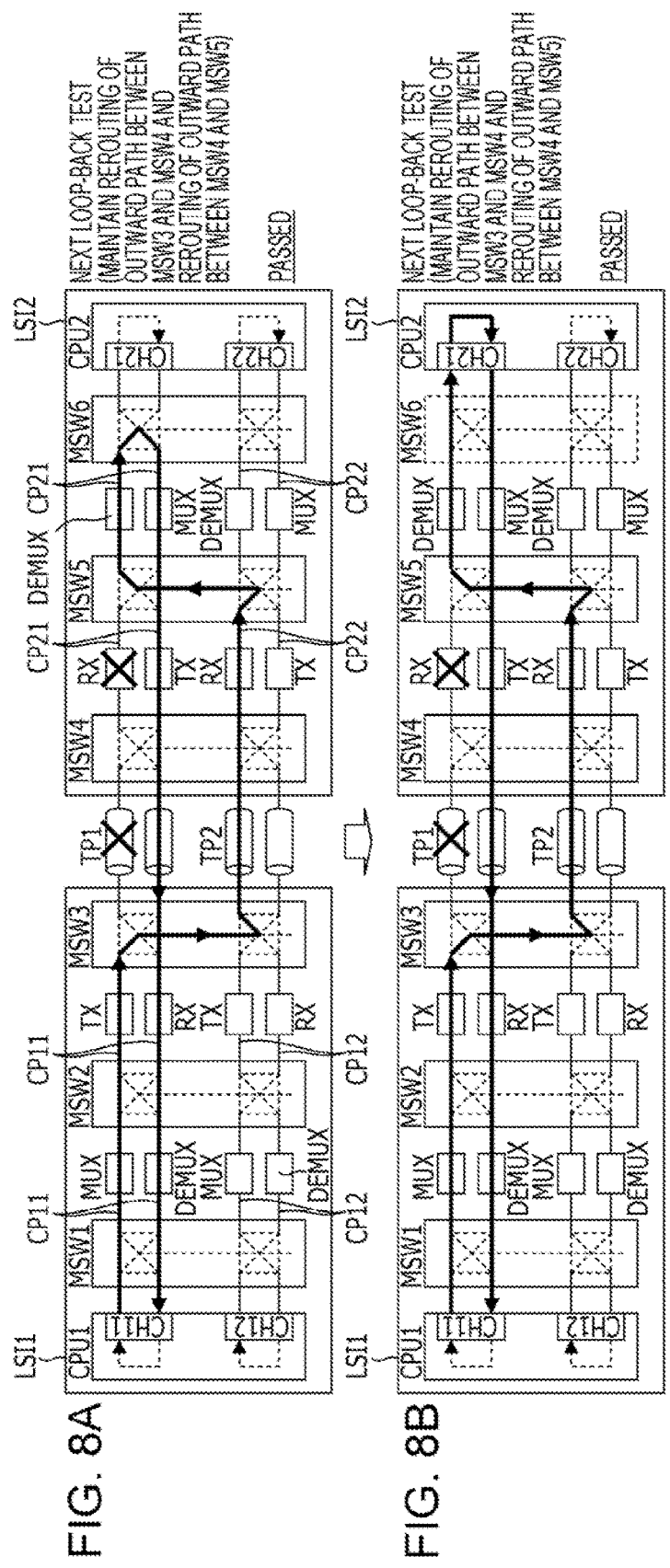

FIG. 9

■ : REROUTING OF OUTWARD PATH

| ADDRESS AD [16-BITS] | | DATA DT [64-BITS] | | | | | | | | (HEXADECIMAL) |
|---|---|---|---|---|---|---|---|---|---|---|
| | | "D" | | "C" | | "B" | | "A" | | |
| CHANNEL | MSW | CHANNEL OF CONNECTION DESTINATION | TERMINAL OF CONNECTION DESTINATION | CHANNEL OF CONNECTION DESTINATION | TERMINAL OF CONNECTION DESTINATION | CHANNEL OF CONNECTION DESTINATION | TERMINAL OF CONNECTION DESTINATION | CHANNEL OF CONNECTION DESTINATION | TERMINAL OF CONNECTION DESTINATION | |
| 01 | 01 | 01 | 0B | 01 | 0A | 01 | 0D | 01 | 0C | 1 |
| 01 | 02 | 01 | 0B | 01 | 0A | 01 | 0D | 01 | 0C | 2 |
| 01 | 03 | 01 | 0B | 00 | 00 | 01 | 0D | 02 | 0C | 3 |
| 01 | 04 | 01 | 0B | 02 | 0A | 01 | 0D | 00 | 00 | 4 |
| 01 | 05 | 01 | 0B | 01 | 0A | 01 | 0D | 01 | 0C | 5 |
| 01 | 06 | 01 | 0B | 00 | 00 | 00 | 00 | 00 | 00 | 6 |
| 02 | 01 | 00 | 00 | 00 | 00 | 00 | 00 | 00 | 00 | 7 |
| 02 | 02 | 00 | 00 | 01 | 0A | 00 | 00 | 02 | 0C | 8 |
| 02 | 03 | 00 | 00 | 02 | 0A | 00 | 00 | 01 | 0C | 9 |
| 02 | 04 | 00 | 00 | 00 | 00 | 00 | 00 | 00 | 00 | 10 |
| 02 | 05 | 00 | 00 | 00 | 00 | 00 | 00 | 00 | 00 | 11 |
| 02 | 06 | 00 | 00 | 00 | 00 | 00 | 00 | 00 | 00 | 12 |
| ... | ... | ... | ... | ... | ... | ... | ... | ... | ... | ... |
| 08 | 01 | 08 | 0B | 08 | 0A | 08 | 0D | 08 | 0C | |
| 08 | 02 | 08 | 0B | 08 | 0A | 08 | 0D | 08 | 0C | |
| 08 | 03 | 08 | 0B | 08 | 0A | 08 | 0D | 08 | 0C | |
| 08 | 04 | 08 | 0B | 08 | 0A | 08 | 0D | 08 | 0C | |
| 08 | 05 | 08 | 0B | 08 | 0A | 08 | 0D | 08 | 0C | |
| 08 | 06 | 08 | 0B | 08 | 0A | 08 | 0D | 08 | 0C | |

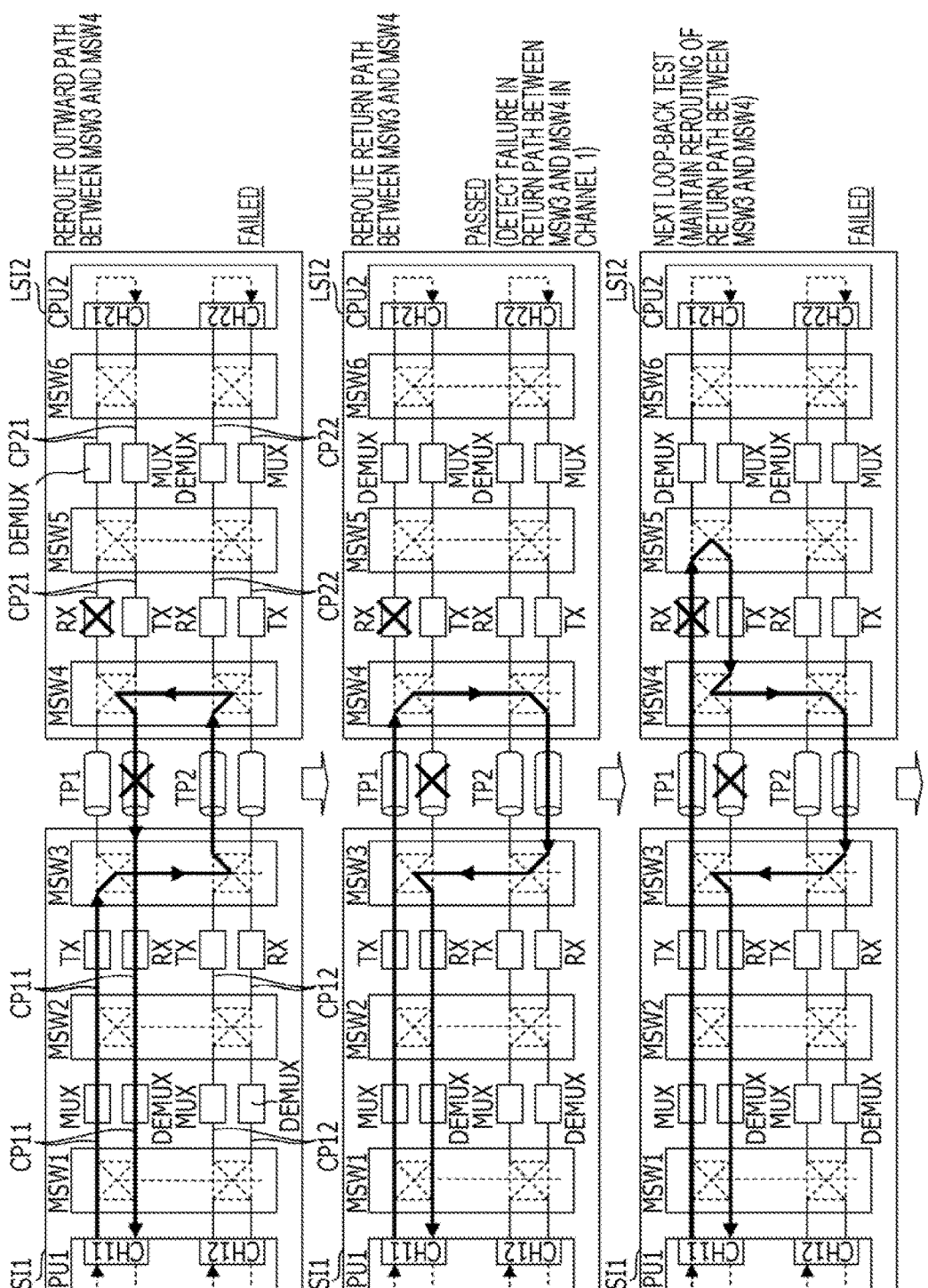

FIG. 12

| ADDRESS AD [16-BITS] | | DATA DT [64-BITS] | | | | | | | |
|---|---|---|---|---|---|---|---|---|---|
| | | "D" | | "C" | | "B" | | "A" | |
| CHANNEL | MSW | CHANNEL OF CONNECTION DESTINATION | TERMINAL OF CONNECTION DESTINATION | CHANNEL OF CONNECTION DESTINATION | TERMINAL OF CONNECTION DESTINATION | CHANNEL OF CONNECTION DESTINATION | TERMINAL OF CONNECTION DESTINATION | CHANNEL OF CONNECTION DESTINATION | TERMINAL OF CONNECTION DESTINATION |
| 01 | 01 | 01 | 0B | 01 | 0A | 01 | 0D | 01 | 0C |
| 01 | 02 | 01 | 0B | 01 | 0A | 01 | 0D | 01 | 0C |
| 01 | 03 | 00 | 00 | 01 | 0A | 02 | 0D | 01 | 0C |
| 01 | 04 | 02 | 0B | 00 | 00 | 00 | 00 | 02 | 0C |
| 01 | 05 | 01 | 0B | 02 | 0A | 01 | 0D | 00 | 00 |
| 01 | 06 | 01 | 0B | 01 | 0A | 00 | 00 | 01 | 0C |
| 02 | 01 | 00 | 00 | 00 | 00 | 00 | 00 | 00 | 00 |
| 02 | 02 | 00 | 00 | 00 | 00 | 00 | 00 | 00 | 00 |
| 02 | 03 | 01 | 0B | 01 | 0A | 01 | 0D | 01 | 0C |
| 02 | 04 | 00 | 00 | 00 | 00 | 00 | 00 | 00 | 00 |
| 02 | 05 | 00 | 00 | 00 | 00 | 00 | 00 | 00 | 00 |
| 02 | 06 | 00 | 00 | 00 | 00 | 00 | 00 | 00 | 00 |
| ... | ... | ... | ... | ... | ... | ... | ... | ... | ... |
| 08 | 01 | 08 | 0B | 08 | 0A | 08 | 0D | 08 | 0C |
| 08 | 02 | 08 | 0B | 08 | 0A | 08 | 0D | 08 | 0C |
| 08 | 03 | 08 | 0B | 08 | 0A | 08 | 0D | 08 | 0C |
| 08 | 04 | 08 | 0B | 08 | 0A | 08 | 0D | 08 | 0C |
| 08 | 05 | 08 | 0B | 08 | 0A | 08 | 0D | 08 | 0C |
| 08 | 06 | 08 | 0B | 08 | 0A | 08 | 0D | 08 | 0C |

: REROUTING OF OUTWARD PATH   : REROUTING OF RETURN PATH   (HEXADECIMAL)

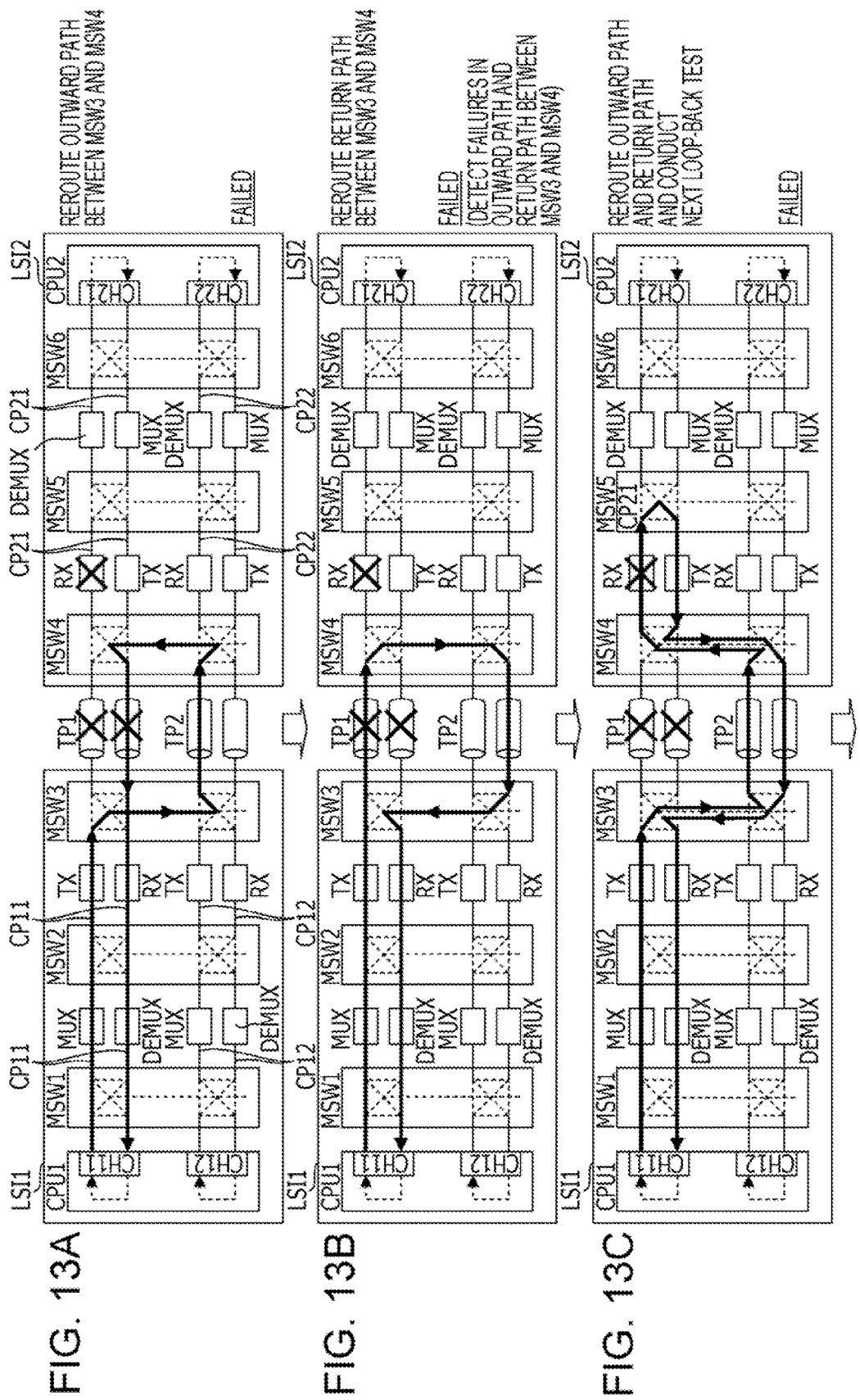

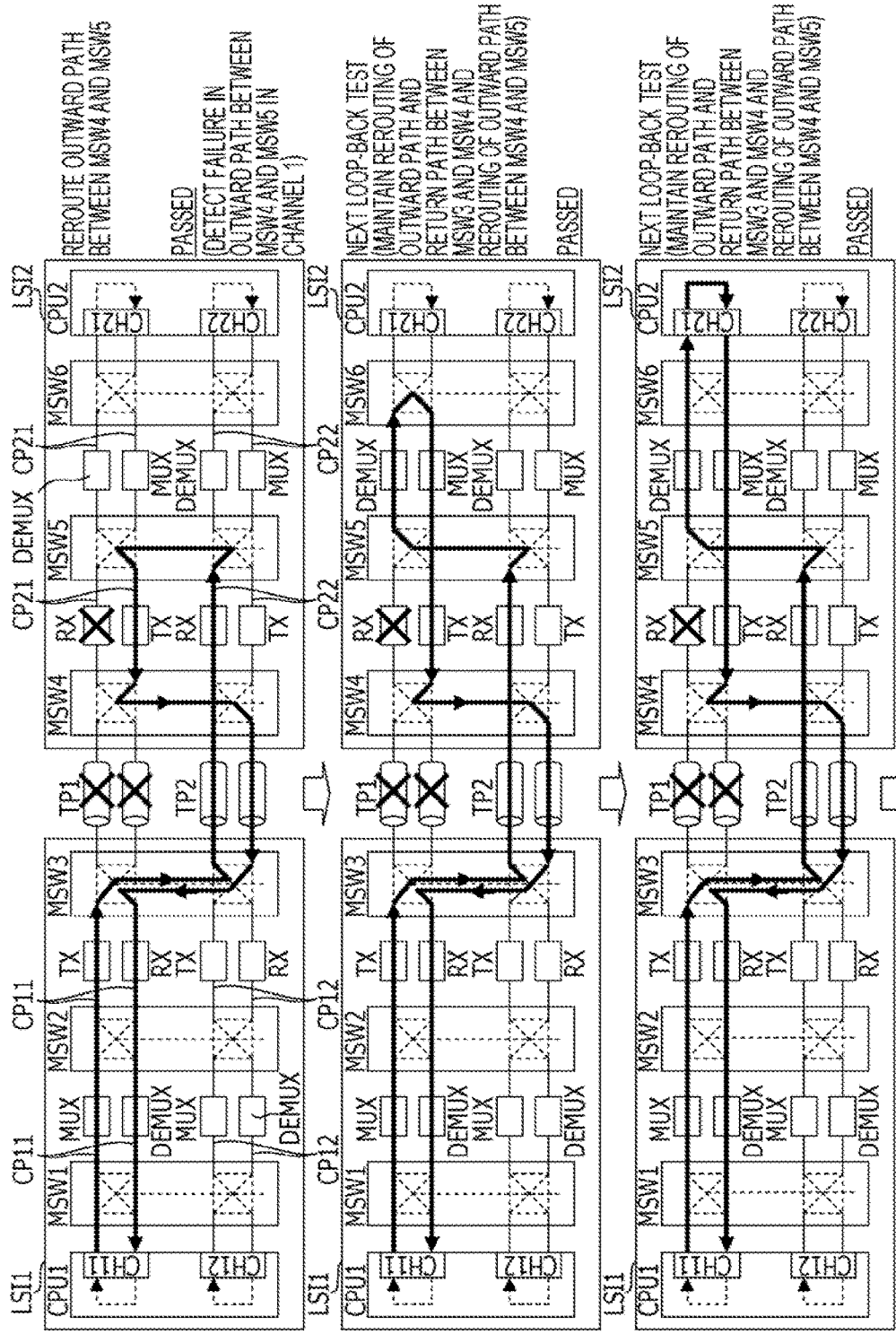

APPARATUS AND METHOD TO DETERMINE PLURAL LOCATIONS IN COMMUNICATION CIRCUITS AT WHICH FAILURES HAVE OCCURRED

CROSS-REFERENCE TO RELATED APPLICATION

This application is based upon and claims the benefit of priority of the prior Japanese Patent Application No. 2016-222987, filed on Nov. 16, 2016, the entire contents of which are incorporated herein by reference.

FIELD

The embodiments discussed herein are related to apparatus and method to determine plural locations in communication circuits at which failures have occurred.

BACKGROUND

A method for enhancing fault tolerance of networks has been proposed in which a network including a plurality of processor modules coupled to each other is reconfigured even when one of switch nodes provided in multiple stages in the network fails (for example, see Japanese Laid-open Patent Publication No. 5-207011). In addition, a method has been proposed in which cross-connect may be realized, by providing a cross connect interface unit at a previous stage of a cross-connect part in which a plurality of inputs and a plurality of outputs are coupled to each other, even in a case in which a failure occurs in the cross-connect part (for example, see Japanese Laid-open Patent Publication No. 6-245236).

SUMMARY

According to an aspect of the invention, an apparatus includes a first communication circuit and a second communication circuit that are configured to transmit and receive information to and from each other through a plurality of first communication paths. Each of the first communication circuit and the second communication circuit including a plurality of second communication paths respectively coupled to the plurality of first communication paths, and a plurality of matrix switches that are provided across the plurality of second communication paths and switch a transmission path of information transmitted to any one of the plurality of second communication paths. When a communication error is detected in the plurality of second communication paths, the apparatus conducts a loop-back test that is a test in which each of the plurality of matrix switches is switched to a loop-back state in which information to be transmitted to one of the plurality of second communication paths in which the communication error has been detected, is looped back. When an error is detected in the loop-back test, the apparatus switches the plurality of matrix switches to a bypass state in which one of the plurality of second communication paths in which the error is detected is bypassed to another one of the plurality of second communication paths to continue the loop-back test.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of switching control information output from a control processor in order to perform switching in switch units of matrix switches, according to an embodiment;

FIG. 6 is a diagram illustrating an example of a loop-back test conducted by a control processor, according to an embodiment;

FIGS. 7A to 7C are diagrams illustrating an example of a loop-back test in test patterns 4 to 7, according to an embodiment;

FIGS. 8A and 8B are diagrams illustrating an example of a loop-back test in test patterns 4 to 7, according to an embodiment;

FIG. 9 is a diagram illustrating an example of switching control information illustrating switching states of matrix switches when a first loop-back test has ended, according to an embodiment;

FIGS. 10A to 10C are diagrams illustrating an example of a loop-back test executed by a control processor, according to an embodiment;

FIG. 12 is a diagram illustrating an example of switching control information indicating switching states of matrix switches when a first loop-back test has ended, according to an embodiment;

FIGS. 13A to 13C are diagrams illustrating an example of a loop-back test executed by a control processor, according to an embodiment;

FIGS. 14A to 14C are diagrams illustrating an example of a loop-back test executed by a control processor, according to an embodiment;

DESCRIPTION OF EMBODIMENTS

As described above, in a case in which a failure occurs in a communication path, communication may be restarted by switching the communication path in which the failure has occurred, to another communication path. At this time, in order to identify a location in which the failure has occurred, transmission of test data or the like is performed, and a component or the like that has caused the failure is replaced. However, in the related art, since it has not been assumed that failures occur in multiple locations on a communication path at the same time, it is difficult to detect each failures occurred in the multiple locations.

It is desirable to detect failure locations when a plurality of failures have occurred in communication circuits that transmit and receive information to and from each other.

Embodiments of the technology discussed herein are described below with reference to drawings.

Figure 1:
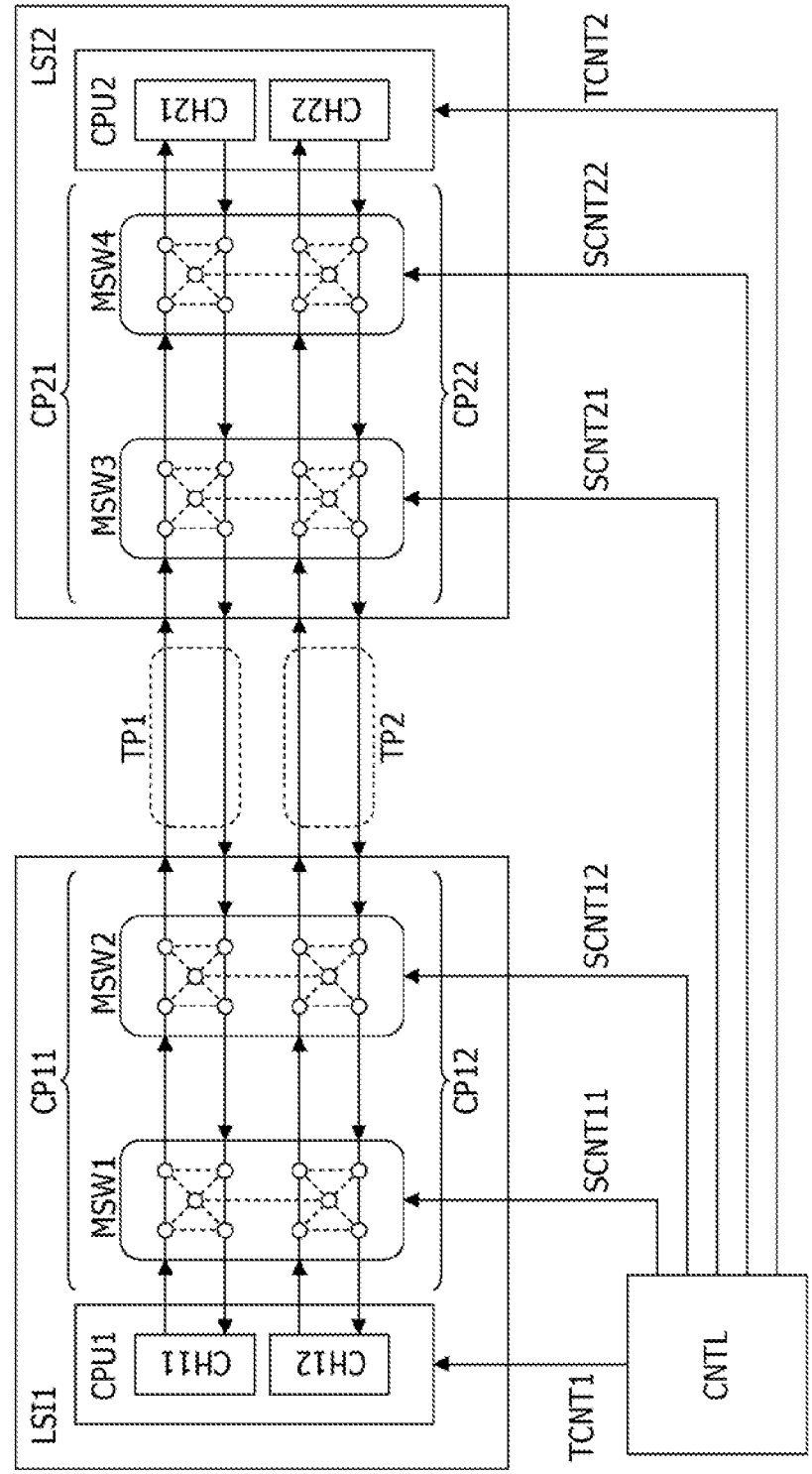
FIG. 1 is a diagram illustrating an example of an information processing device, according to an embodiment.

FIG. 1 is a diagram illustrating an information processing device according to an embodiment. An information processing device IPE1 illustrated in FIG. 1 includes semiconductor devices LSI1 and LSI2 (LSI: large-scale integration), and a control processor CNTL. The semiconductor devices LSI1 and LSI2 transmit and receive information to and from each other through a plurality of transmission paths TP (TP1 and TP2). Although not particularly limited, information is transmitted between the semiconductor devices LSI1 and LSI2 by using an electric signal. For example, the semiconductor device LSI1 and the control processor CNTL are mounted on a single substrate such as a printed board, and the semiconductor device LSI2 is mounted on another substrate. When the substrates are coupled to a backplane provided in a rack, the semiconductor devices LSI1 and LSI2 are coupled to each other. In this case, the transmission paths TP include a single line wired to the backplane.

The semiconductor device LSI1 is an example of a first communication circuit, and the semiconductor device LSI2 is an example of a second communication circuit. The transmission paths TP are an example of first communication paths. The control processor CNTL is an example of a detection control unit that controls detection of a failure that occurs in the semiconductor device LSI1 or LSI2, or the transmission paths TP. In the following description, the semiconductor devices LSI1 and LSI2 are respectively simply referred to as an LSI1 and an LSI2.

In the following description, in the transmission paths TP, a path indicated by an arrow that heads from an LSI that transmits information to an LSI that receives the information is referred to as an outward path, and a path indicated by an arrow that heads from the LSI that receives information to the LSI that transmit the information is referred to as a return path. For example, when the LSI1 transmits information to the LSI2, an arrow that heads from the LSI1 to the LSI2 is referred to as an outward path, and an arrow that heads from the LSI2 to the LSI1 is referred to as a return path. On the other hand, when the LSI2 transmits information to the LSI1, an arrow that heads from the LSI2 to the LSI1 is referred to as an outward path, and an arrow that heads from the LSI1 to the LSI2 is referred to as a return path.

The LSI1 includes a plurality of communication paths CP1 (CP11 and CP12) respectively coupled to the plurality of transmission paths TP1 and TP2, and a plurality of matrix switches MSW (MSW1 and MSW2) provided across the plurality of communication paths CP1. In addition, the LSI1 includes a central processing unit (CPU) 1 that transmits information to the plurality of communication paths CP1 and receives information from the plurality of communication paths CP1. For example, the CPU1 includes communication interface units CH1 (CH11 and CH12) that are respectively coupled to the communication paths CP11 and CP12 and transmit and receive information to and from the communication paths CP11 and CP12. The CPU1 is an example of a communication control unit that transmits information to the plurality of communication paths CP11 and CP12 and receives information from the plurality of communication paths CP11 and CP12. The communication paths CP11 and CP12 are an example of a plurality of second communication paths.

Each of the matrix switches MSW1 and MSW2 includes a function to switch a transmission path of information transmitted to one of the plurality of communication paths CP1, based on switching control information SCNT (SCNT11 or SCNT12) output from the control processor CNTL. For example, each of the matrix switches MSW1 and MSW2 includes a function to set a loop-back state in which information output from the communication interface unit CH11 is looped back to the communication interface unit CH11 by switching of a transmission path.

Each of the matrix switches MSW1 and MSW2 includes a function to set a loop-back state in which information output from the communication interface unit CH12 is looped back to the communication interface unit CH12 by switching of a transmission path. In addition, each of the matrix switches MSW1 and MSW2 includes a function to set a bypass state in which information transmitted to one of the communication paths CP1 bypasses to the other of communication paths CP1 by switching of a transmission path. For example, each of the matrix switches MSW1 and MSW2 may include a function to set a loop back state in which information output from a communication interface unit CH21 is looped back to the communication interface unit CH21 by switching of a transmission path.

The LSI1 may include, between the matrix switches MSW1 and MSW2, a communication processor that is coupled to each of the communication paths CP11 and CP12 and executes transmission processing or reception processing of information. The communication processor may be a multiplexer, a demultiplexer, a transmitter, a receiver, or the like. The LSI1 may include three or more matrix switches.

Similar to the LSI1, the LSI2 includes a plurality of communication paths CP2 (CP21 and CP22) respectively coupled to the plurality of transmission paths TP1 and TP2, and a plurality of matrix switches MSW3 and MSW4 provided across the plurality of communication paths CP2. In addition, the LSI2 includes a CPU2 including communication interface units CH2 (CH21 and CH22) respectively coupled to the communication paths CP21 and CP22. The CPU2 is an example of a communication control unit that transmits information to the plurality of communication paths CP21 and CP22 and receives information from the plurality of communication paths CP21 and CP22. Each of the communication paths CP21 and CP22 is an example of a second communication path.

Each of the matrix switches MSW3 and MSW4 includes a function to switch a transmission path of information transmitted to one of the plurality of communication paths CP2, based on switching control information SCNT (SCNT21 or SCNT22) output from the control processor CNTL. For example, each of the matrix switches MSW3 and MSW4 includes a function to set a loop-back state in which information output from the communication interface unit CH11 of the LSI1 is looped back to the communication interface unit CH11 by switching of a transmission path. Each of the matrix switches MSW3 and MSW4 includes a function to set a loop-back state in which information output from the communication interface unit CH12 of the LSI1 is looped back to the communication interface unit CH12 by switching of a transmission path. In addition, each of the matrix switches MSW3 and MSW4 includes a function to set a bypass state in which information transmitted to one of the communication paths CP2 bypasses to the other of the communication paths CP2 by switching of a transmission path. For example, each of the matrix switches MSW3 and MSW4 may include a function to set a loop-back state in which information output from the communication interface unit CH21 of the LSI2 is looped back to the communication interface unit CH21 by switching of a transmission path.

The LSI2 may include, between the matrix switches MSW3 and MSW4, a communication processor that is coupled to each of the communication paths CP21 and CP22 and executes transmission processing or reception processing of information. The communication processor may be a multiplexer, a demultiplexer, a transmitter, a receiver, or the like. The LSI2 may include three or more matrix switches.

In the information processing device IPE1 illustrated in FIG. 1, a single channel is constituted by the communication interface units CH11 and CH21, the communication paths CP11 and CP21, and the transmission path TP1. In addition, the other channel is constituted by the communication interface units CH12 and CH22, the communication paths CP12 and CP22, and the transmission path TP2. In addition, in the information processing device IPE1, communication of information is performed using each of the channels independently. The CPU1 may include three or more communication interface units CH1, and the CPU2 may include three or more the communication interface units CH2. That is, the information processing device IPE1 may include three or more channels. In the following description, in order to make the explanation easier to understand, an example is described in which transmission and reception of information are performed using the semiconductor device LSI1 as a reference, and an arrow that heads from the CPU1 to the CPU2 is referred to as an outward path, and an arrow that heads from the CPU2 to the CPU1 is referred to as a return path.

The control processor CNTL includes a function to generate test control information TCNT1 that is to be output to the CPU1 and a function to generate test control information TCNT2 that is to be output to the CPU2. In addition, the control processor CNTL includes a function to generate switching control information SCNT (SCNT11, SCNT12, SCNT21, and SCNT22) that are to be respectively output to the matrix switches MSW1 to MSW4. The function of the control processor CNTL may be realized by a device other than a processor such as a logic circuit. The mode of the CPU1 transitions from a normal mode to a test mode based on the test control information TCNT1, and the mode of the CPU2 transitions from the normal mode to the test mode based on the test control information TCNT2.

The CPU1 transitioned to the test mode conducts a loop-back test in which test data is transmitted to the communication path CP1 (outward path), and the transmitted test data is received from the communication path CP1 (return path) via the communication interface unit CH1 specified by the control processor CNTL. The CPU2 whose mode has transitioned to the test mode outputs received test data to the communication path CP2 (return path) when the CPU has received the test data from the communication path CP2 (outward path). In addition, the CPU1 determines whether communication of the test data has been performed successfully, based on the received test data, and notifies the control processor CNTL of the determination result.

The control processor CNTL switches the connection state of each of the matrix switches MSW1 to MSW4 based on the determination result from the CPU1, and causes the CPU1 to repeatedly execute the loop-back test. As a result, the control processor CNTL detects a failure that has occurred in the communication path CP1 or CP2 or the transmission path TP1 or TP2. The example in which a failure is detected by the control processor CNTL is illustrated in FIGS. 2A to 3C.

FIGS. 2A to 3C are diagrams illustrating an example of a failure detection method of the information processing device IPE1 illustrated in FIG. 1. In FIGS. 2A to 3C, an example in which, in the normal mode, a communication error is detected during communication of information between the LSI1 and the LSI2 using a channel including the communication paths CP1 and CP2 and the transmission path TP1, and the control processor CNTL illustrated in FIG. 1 determines occurrence locations of the failures. Here, a description is made below on the premise that failures respectively occur in two locations indicated by bold X symbols.

First, when a communication error has been detected during the communication in the normal mode, the LSI1 or the LSI2 notifies the control processor CNTL of an occurrence of the communication error. At that time, a location at which the communication error has occurred is yet to be determined. The notification of the communication error may be performed from the LSI1 or the LSI2 to the control processor CNTL through a management device provided in the information processing device IPE1.

The control processor CNTL that has received information indicating the occurrence of the communication error outputs test control information TCNT1 and TCNT2 to the CPUs 1 and 2, respectively, and causes the mode of the CPUs 1 and 2 to transition from the normal mode to the test mode. The control processor CNTL instructs the CPU1 to conduct a loop-back test by using the communication interface unit CH11 illustrated in FIG. 1. In addition, the control processor CNTL instructs the CPU2 to send test data back to the CPU1 when the communication interface unit CH21 illustrated in FIG. 1 has received the test data.

Here, the loop-back tests include a first loop-back test, a second loop-back test, and a third loop-back test. In the first loop-back test, test data is looped back without bypassing in both of the outward path and the return path of the communication paths CP1 and CP2 just before a matrix switch MSW at which the test data is looped back, and the presence or absence of a communication error is detected. That is, in the first loop-back test, the test data is transmitted only through the communication paths CP1 and CP2 of a channel in which a communication error has been detected.

In the second loop-back test, test data is looped back by bypassing in only the outward path of the communication path CP1 (or CP2) just before the matrix switch MSW at which the test data is looped back, and the presence or absence of a communication error is detected. In the third loop-back test, test data is looped back by bypassing in only the return path of the communication path CP1 (or CP2) just before the matrix switch MSW at which the test data is looped back, and the presence or absence of a communication error is detected. That is, in the second loop-back test and the third loop-back test, transmission of the test data is performed so that the test data is rerouted to a part of the communication paths CP1 and CP2 other than the channel in which the communication error has been detected.

Figures 2A, 2B, 2C:
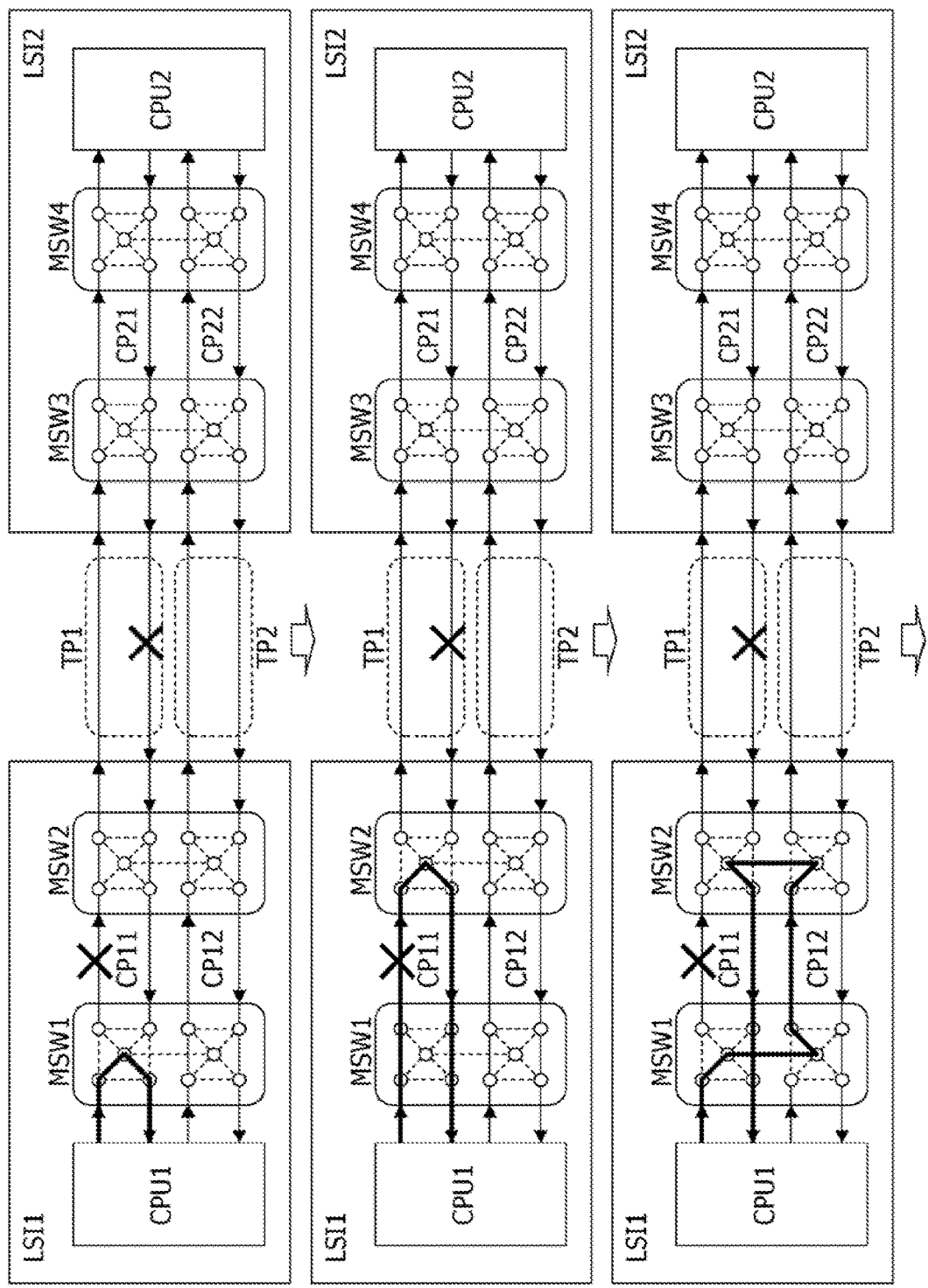
FIGS. 2A to 2C are diagrams illustrating an example of a failure detection method of an information processing device, according to an embodiment.

In FIG. 2A, as illustrated by the bold line, the control processor CNTL sets a loop-back state in which the communication path CP11 is returned at the matrix switch MSW1, and causes the CPU1 to conduct a first loop-back test.

After the conduction of the first loop-back test, the CPU1 has successfully received the test data that had been looped back at the matrix switch MSW1, so that the CPU1 outputs a determination result indicating that the first loop-back test has passed, to the control processor CNTL. The control processor CNTL determines that the communication path CP11 between the CPU1 and the matrix switch MSW1 is operating normally, based on the determination result of the first loop-back test (passed). Also in FIG. 2B and the subsequent figures, a path through which test data is transmitted is illustrated by the bold line.

Next, in FIG. 2B, the control processor CNTL sets a loop-back state in which the communication path CP11 is returned at the matrix switch MSW2, and causes the CPU1 to conduct the first loop-back test. The CPU1 does not successfully receive the test data that has been looped back at the matrix switch MSW2, so that the CPU1 outputs a determination result indicating that the first loop-back test has failed, to the control processor CNTL. The control processor CNTL detects occurrence of a communication error, based on the determination result of the first loop-back test (failed), and determines that a failure has occurred in the communication path CP11 between the matrix switches MSW1 and MSW2.

Next, in FIG. 2C, the control processor CNTL sets a bypass state in which the outward path of the communication path CP11 between the matrix switches MSW1 and MSW2 is rerouted to the communication path CP12 in order to determine whether the failure has occurred in the outward path or the return path. Here, it is assumed to be confirmed that the communication paths CP12 and CP22 and the transmission path TP2 are operating normally due to the communication in the normal mode. The control processor CNTL causes the CPU1 to conduct the second loop-back test. The CPU1 outputs a determination result indicating that the second loop-back test has passed to the control processor CNTL, because the CPU1 successfully receives the test data that has rerouted in the outward path to the communication path CP12 and has been looped back at the matrix switch MSW2.

The control processor CNTL determines that a failure has occurred in the outward path of the communication path CP11 between the matrix switches MSW1 and MSW2, based on the determination result of the second loop-back test (passed). That is, when the second loop-back test is conducted so that the outward path of the communication path CP11 in which the failure has occurred is rerouted to the other communication path CP12, and an error is not detected in the second loop-back test, the control processor CNTL detects a failure occurring in the outward path of the communication path CP11.

Figures 3A, 3B, 3C:
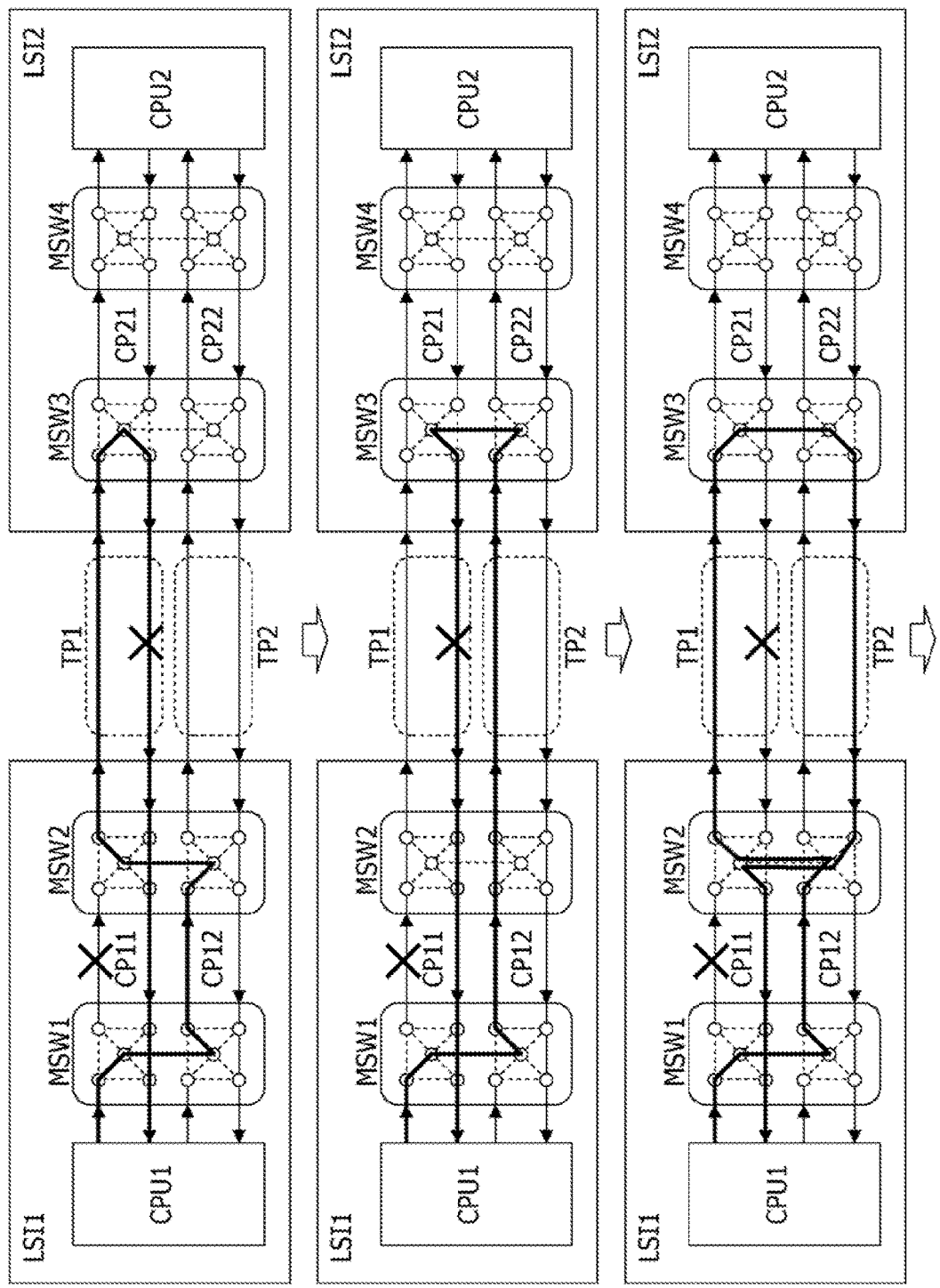
FIGS. 3A to 3C are diagrams illustrating an example of a failure detection method, according to an embodiment.

Next, in FIG. 3A, the control processor CNTL sets a loop-back state in which the transmission path TP1 is returned at the matrix switch MSW3. At this time, the bypass state is maintained in which the outward path of the communication path CP11 between the matrix switches MSW1 and MSW2 is rerouted to the communication path CP12. The control processor CNTL causes the CPU1 to conducts a first loop-back test.

The CPU1 does not receive the test data that has been looped back at the matrix switch MSW3, so that the CPU1 outputs a determination result indicating that the first loop-back test has failed, to the control processor CNTL. The control processor CNTL determines that a failure has occurred between the matrix switches MSW2 and MSW3 (for example, the transmission path TP1), based on the determination result of the first loop-back test (failed).

Next, in FIG. 3B, the control processor CNTL sets a bypass state in which the outward path of the transmission path TP1 is rerouted to the transmission path TP2 in order to determine whether the failure has occurred in the outward path or the return path of the transmission path TP1. At this time, the bypass state is maintained in which the outward path of the communication path CP11 between the matrix switches MSW1 and MSW2 is rerouted to the communication path CP12.

Then, the control processor CNTL causes the CPU1 to conduct a second loop-back test. Since the CPU1 does not successfully receive test data that has been rerouted in the outward path to the transmission path TP2 of the outward path and has been looped back at the matrix switch MSW3, the CPU1 outputs a determination result indicating that the second loop-back test has failed, to the control processor CNTL. The control processor CNTL determines that the failure has occurred in both of the outward path and the return path of the transmission path TP1, or in the return path of the transmission path TP1, based on the determination result of the second loop-back test (failed).

Next, in FIG. 3C, the control processor CNTL sets a bypass state in which the return path of the transmission path TP1 is rerouted to the transmission path TP2. At this time, the bypass state, in which the outward path of the communication path CP11 between the matrix switches MSW1 and MSW2 is rerouted to the communication path CP12, is maintained. Then, the control processor CNTL causes the CPU1 to conduct a third loop-back test. The CPU1 successfully receives test data that has been looped back at the matrix switch MSW3 and has been rerouted in the return path to the transmission path TP2, so that the CPU1 outputs a determination result indicating that the third loop-back test has passed, to the control processor CNTL.

The control processor CNTL determines that the failure has occurred in the return path of the transmission path TP1 between the matrix switches MSW2 and MSW3, based on the determination result of the third loop-back test (passed). That is, when the control processor CNTL detects an error in the second loop-back test in which the outward path of the transmission path TP1 has been rerouted, and does not detect an error in the third loop-back test in which the return path of the transmission path TP1 has been rerouted, the control processor CNTL detects a failure occurring in the return path of the transmission path TP1.

When failures have respectively occurred in both of the outward path and the return path of the transmission path TP1, the CPU1 detects an error in the third loop-back test illustrated in FIG. 3C. That is, the control processor CNTL detects an error in the second loop-back test in which the outward path of the transmission path TP1 has been rerouted, and further detects an error in the third loop-back test in which the return path of the transmission path TP1 has been rerouted. In this case, the control processor CNTL detects the respective failures occurring in the outward path and the return path of the transmission path TP1 between the matrix switches MSW2 and MSW3.

After that, the control processor CNTL sets a loop-back state in which the communication path CP21 is returned at the matrix switch MSW4, and causes the CPU1 to conduct a first loop-back test. At this time, the bypass state of the outward path between the matrix switches MSW1 and MSW2 and the bypass state of the return path between the matrix switches MSW2 and MSW3 are maintained.

In a manner similar to the description with reference to FIGS. 2B to 3C, when the first loop-back test has failed, the control processor CNTL reroutes the outward path or the return path between the matrix switches MSW3 and MSW4 and identifies a failure location. In addition, the control processor CNTL sets a loop-back state in which the communication path CP21 is returned at the CPU2 (communication interface unit CH21 illustrated in FIG. 1), and causes the CPU1 to conduct the first loop-back test. When an error has occurred in the first loop-back test in which test data is looped back at the CPU2, the control processor CNTL detects a failure occurring in the communication interface unit CH21 of the CPU2 (FIG. 1).

As described above, even in a case in which failures have occurred in a plurality of locations in the communication paths CP11 and CP21 and the transmission path TP1, when the outward path or the return path between mutually-adjacent two matrix switches MSW is rerouted, the locations that are causes of the failures may be identified. That is, when failures have respectively occurred in a plurality of locations in a single channel, the failure locations may be identified easily as compared with the related art.

Further, for example, when an error has been detected in the first loop-back test illustrated in FIG. 2B or 3A, the control processor CNTL may cause the CPU1 to conduct a second loop-back test by bypassing in the outward path after having caused the CPU1 to conduct a third loop-back test by bypassing in the return path. In this case, the control processor CNTL detects a failure occurring in the return path when an error is not detected in the third loop-back test, and conducts the second loop-back test by bypassing in the outward path when an error has been detected in the third loop-back test. In addition, the control processor CNTL detects a failure occurring in the outward path when an error is not detected in the second loop-back test, and respectively detects failures occurring in both of the outward path and the return path when an error has been detected in the second loop-back test.

Even in a case in which the information processing device IPE1 includes three or more channels, by using at least a single channel that is operating normally as a bypass route, a failure location in a channel in which a failure has occurred may be identified. In addition, in FIGS. 2A to 3C, the example is described in which a loop-back test is conducted so that test data is output from the CPU1, but a loop-back test may be conducted so that test data is output from the CPU2. In this case, an arrow that heads from the CPU2 to the CPU1 is an outward path, and an arrow that head from the CPU1 to the CPU2 is a return path.

As described above, in the embodiment illustrated in FIGS. 1 to 3C, when communication of information is performed between the LSI1 and the LSI2 using a plurality of channels, the locations of a plurality of failures that have occurred in the communication paths CP1 and CP2 and the transmission path TP may be identified. When the control processor CNTL causes the CPU1 to conduct a loop-back test while performing switching in a matrix switch MSW, the control processor CNTL may identify the plurality of failure locations without the intervention of a maintenance worker or the like. As a result, as compared with a case in which the failure locations are identified by the maintenance worker or the like, the failures may be restored quickly, and the reliability of the information processing device IPE1 may be improved. In addition, when at least a single channel is operating normally, a failure location in another channel may be identified.

Figure 4:
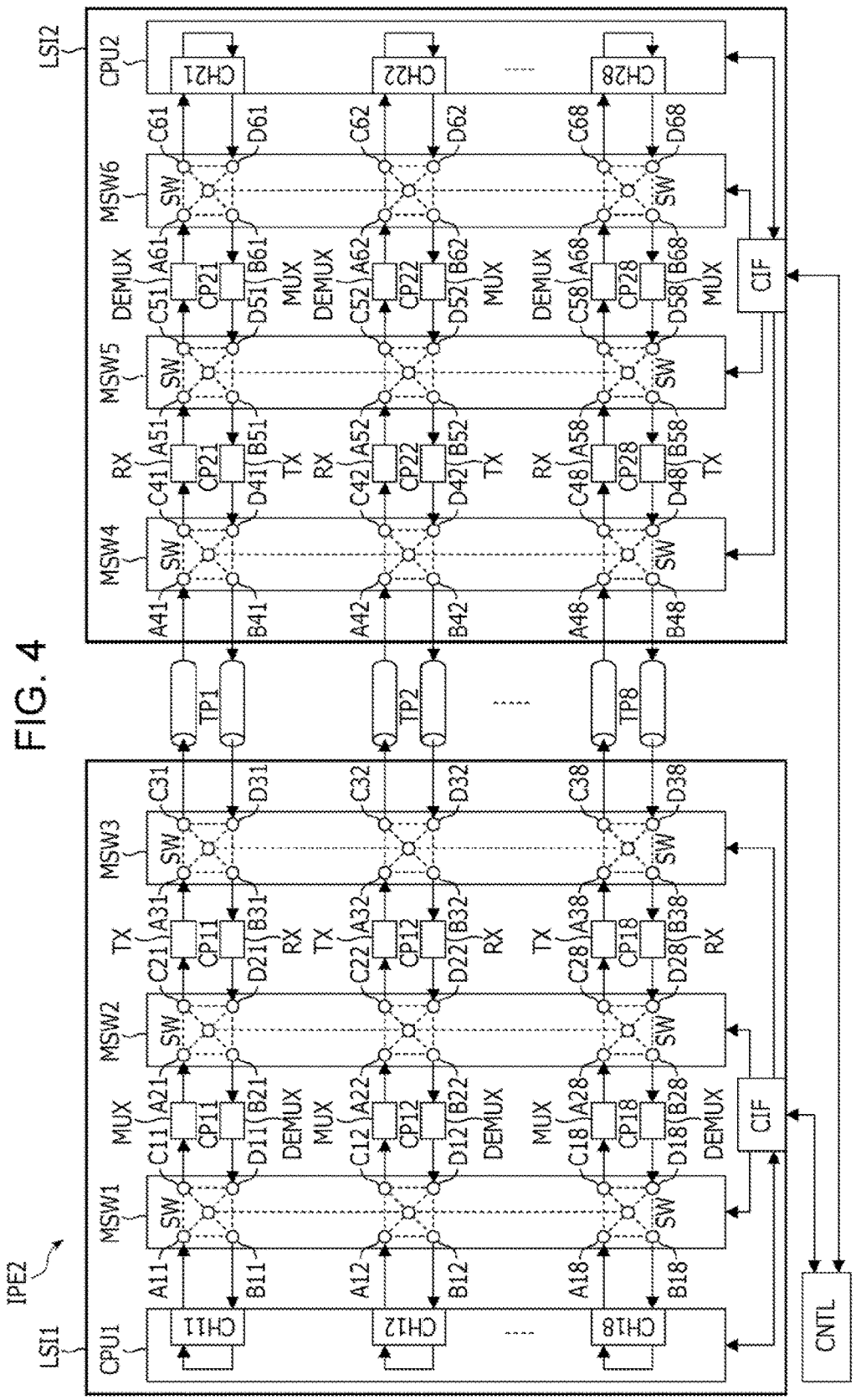
FIG. 4 is a diagram illustrating an example of an information processing device, according to an embodiment.

FIG. 4 is a diagram illustrating an information processing device according to another embodiment. The same symbol is assigned to an element that is the same as or similar to the element described with reference to FIG. 1, and the detailed description is omitted herein. An information processing device IPE2 according to the embodiment includes an LSI1 and an LSI2 that transmit and receive information to and from each other through a plurality of transmission paths TP (TP1, TP2, . . . , and TP8), and a control processor CNTL. That is, the LSI1 and the LSI2 may transmit and receive information to and from each other through the eight channels. It is only sufficient that the number of channels desired for communication between the LSI1 and the LSI2 is "2" or more.

Similar to the information processing device IPE1 illustrated in FIG. 1, for example, the LSI1 and the LSI2 are respectively mounted on substrates coupled to each other through a backplane provided in a rack, and the control processor CNTL is mounted on the substrate on which the LSI1 is mounted. The transmission path TP includes a signal line wired to the backplane.

The LSI1 includes a CPU1 including communication interface units CH1 (CH11, CH12, . . . , and CH18), and a plurality of communication paths CP1 (CP11, CP12, . . . , and CP18) that respectively couple the communication interface units CH1 to the transmission paths TP. The functions of the communication interface units CH11 to CH18 are similar to the functions of the communication interface units CH11 and CH12 provided in the CPU1 illustrated in FIG. 1.

In addition, the LSI1 includes a plurality of matrix switches MSW (MSW1, MSW2, and MSW3) provided across the plurality of communication paths CP1, and a control interface unit CIF. The functions of the matrix switch MSW1 to MSW3 are similar to the functions of the matrix switches MSW1 and MSW2 illustrated in FIG. 1. The control interface unit CIF controls transmission and reception of information to and from the control processor CNTL, the CPU1, and the matrix switches MSW1 MSW2, and MSW3. The LSI1 may include four or more matrix switches MSW.

In the outward path (right arrow) of each of the communication paths CP1 through which information is transmitted from the CPU1 to the transmission path TP, a multiplexer MUX is provided between the matrix switches MSW1 and MSW2, and a transmitter TX is provided between the matrix switches MSW2 and MSW3. In the return path (left arrow) of each of the communication paths CP1 through which information is transmitted from the transmission path TP to the CPU1, a receiver RX is provided between the matrix switches MSW3 and MSW2, and a demultiplexer DEMUX is provided between the matrix switches MSW2 and MSW1. The multiplexer MUX converts a parallel signal into a serial signal, and the demultiplexer DEMUX converts a serial signal into a parallel signal. The transmitter TX outputs a signal received from the multiplexer MUX to the transmission path TP, and the receiver RX outputs a signal received from the transmission path TP to the demultiplexer DEMUX.

Similar to the LSI1, the LSI2 includes a CPU2 including communication interface units CH2 (CH21, CH22, . . . , and CH28), and a plurality of communication paths CP2 (CP21 and CP22, . . . , and CP28) that respectively couple the communication interface units CH2 to the transmission paths TP. The functions of the communication interface units CH21 to CH28 are similar to the functions of the communication interface units CH21 to CH22 provided in the CPU2 illustrated in FIG. 1. In addition, the LSI2 includes a plurality of matrix switches MSW (MSW4, MSW5, and MSW6) provided across the plurality of communication paths CP2, and a control interface unit CIF. The functions of the matrix switches MSW4 to MSW6 are similar to the functions of the matrix switches MSW3 and MSW4 illustrated in FIG. 1. The LSI2 may include four or more matrix switches MSW.

In the return path (left arrow) of each of the communication paths CP2 through which information is transmitted from the CPU2 to the transmission path TP, a multiplexer MUX is provided between the matrix switches MSW6 and MSW5, and a transmitter TX is provided between the matrix switches MSW5 and MSW4. In the outward path (right arrow) of each of the communication paths CP2 through which information is transmitted from the transmission path TP to the CPU2, a receiver RX is provided between the matrix switches MSW4 and MSW5, and a demultiplexer DEMUX is provided between the matrix switches MSW5 and MSW6.

Each of the matrix switches MSW1 to MSW6 includes a switch unit SW for each of the channels, and receives switching control information output from the control processor CNTL through the control interface unit CIF. Each of the matrix switches MSW1 to MSW6 switches a transmission path based on the received switching control information and sets the state of the switch unit SW to a normal state, a loop-back state, or a bypass state.

The normal state is a state in which the terminal A and the terminal C of the switch unit SW are coupled to each other, and the terminal B and the terminal D of the switch unit SW are coupled to each other. The loop-back state is a state in which the terminal A and the terminal B of the switch unit SW are coupled to each other, or the terminal C and the terminal D of the switch unit SW are coupled to each other. The bypass state is a state in which one of the terminals A, B, C, and D of the switch unit SW is coupled to one of terminals A, B, C, and D of a switch unit SW in a different channel. In the two-digit number added to the end of each of the terminals A, B, C, and D of the switch unit SW, the upper-digit number indicates a number of the matrix switch MSW, and the lower-digit number indicates a number of the channel.

FIG. 5 is a diagram illustrating an example of switching control information output from the control processor CNTL in order to perform switching in the switch units SW of the matrix switches MSW illustrated in FIG. 4. The switching control information illustrated in FIG. 5 indicate the state of FIG. 7A. In FIG. 5, each piece of switching control information is indicated by an 8-bit hexadecimal number. Examples of the switching control information include an address AD (for example, 16-bits) that specifies a switch unit SW that switches a transmission path and data DT (for example, 64-bits) that specifies the state of the specified switch unit SW.

The upper 8-bits of the address AD indicates a number assigned to a channel (any of 1 to 8), and the lower 8-bits of the address AD indicates a number assigned to a matrix switch MSW (any of 1 to 6). That is, a single row of the table illustrated in FIG. 5 indicates the state of a single switch unit SW.

The data DT includes 8-bits information indicating a number assigned to a channel of a connection destination and 8-bits information indicating a terminal of the connection destination, for each of the terminals A, B, C, and D of the switch unit SW. When 16-bits value that has been assigned for each of the terminals A, B, C, and D is "00", it is indicated that the terminal is not coupled to any of the channels and terminals (open state). The 8-bits information indicating a terminal of a connection destination is "0A", "0B", "0C", or "0D" that is a hexadecimal ("00001010", "00001011", "00001100", or "00001101" in binary), which indicates terminal names A, B, C, or D, respectively. As a result, for example, when debugging or the like of the control processor CNTL is performed during the development of the information processing device IPE2, the designer may easily understand a terminal name of a connection destination based on data DT that has been output to a debug list or the like.

For example, the first row of the table illustrated in FIG. 5 indicates that, in the switch unit SW of the channel 1 of the matrix switch MSW1, the terminal D and the terminal B are coupled to each other, and the terminal C and the terminal A are coupled to each other. The third row of the table indicates that, in the switch unit SW of the channel 1 of the matrix switch MSW3, the terminal D and the terminal B are coupled to each other, and the terminal C is set at the open state, and the terminal A is coupled to a terminal C of the switch unit SW of the channel 2 of the matrix switch MSW3. In this case, in the ninth row of the table, which indicates the state of the switch unit SW of the channel 2 of the matrix switch MSW3, the connection destination of the terminal C is set at the terminal A of the switch unit SW of the channel 1.

The fourth row of the table indicates that, in the switch unit SW of the channel 1 of the matrix switch MSW4, the terminals D, C, and A are set at the open state, and the terminal B is coupled to a terminal A of the switch unit SW of the channel 2 of the matrix switch MSW4. In this case, in the tenth row of the table, which indicates the state of the switch unit SW of the channel 2 of the matrix switch MSW4, the connection destination of the terminal A is set at the terminal B of the switch unit SW of the channel 1.

FIG. 6 is a diagram illustrating an example of a loop-back test conducted by the control processor CNTL illustrated in FIG. 4. That is, FIG. 6 is a diagram illustrating an example of a failure detection method of the information processing device. The detail of an operation similar to that of FIGS. 2A to 3C is omitted herein. The loop-back test illustrated in FIG. 6 is started when a communication error has been detected in any of the channels. The loop-back test includes a first loop-back test, a second loop-back test, and a third loop-back test, as described above with reference to FIGS. 2A to 3C.

In the following description, for example, as illustrated in FIG. 7A, a case is described in which failures has respectively occurred in two locations of the outward path of the transmission path TP1 of the channel 1 and the receiver RX of the channel 1 in the LSI2 (bold X symbols), and a communication error has occurred in the channel 1. In the following description, a path through which data is transmitted from the CPU1 to the CPU2 is referred to as an outward path, and a path through which data is transmitted from the CPU2 to the CPU1 is referred to as a return path. The control processor CNTL sequentially executes first loop-back tests illustrated in test patterns 1 to 7.

First, as illustrated in the test pattern 1, the control processor CNTL causes the CPU1 to conduct a first loop-back test in which test data is looped back at the matrix switch MSW1, using the channel 1 in which a communication error has occurred. When the loop-back test by the test pattern 1 has passed, as illustrated in the test pattern 2, the control processor CNTL causes the CPU1 to conduct a first loop-back test in which test data is looped back at the matrix switch MSW2, by using the channel 1.

When the loop-back test by the test pattern 2 has passed, as illustrated in the test pattern 3, the control processor CNTL causes the CPU1 to conduct a first loop-back test in which test data is looped back at the matrix switch MSW3, by using the channel 1. When the loop-back test by the test pattern 3 has passed, as illustrated in the test pattern 4, the control processor CNTL causes the CPU1 to conduct a first loop-back test in which test data is looped back at the matrix switch MSW4, by using the channel 1.

In this example, a failure occurs in the outward path of the transmission path TP1 of the channel 1, so that the first loop-back test fails. When the first loop-back test has failed in which the test data is looped back at the matrix switch MSW4, the control processor CNTL reroutes one of the outward path or the return path between the matrix switches MSW3 and MSW4 of the channel 1 in which the communication error has been detected, to another channel. In this example, as illustrated in FIG. 7A, the outward path of the transmission path TP1 is rerouted to the channel 2. Then, the control processor CNTL causes the CPU1 to conduct a second loop-back test in which test data is looped back at the matrix switch MSW4.

Since the second loop-back test is conducted while avoiding the outward path of the transmission path TP1 of the channel 1, the second loop-back test passes. The control processor CNTL determines that a failure has occurred in the outward path including the transmission path TP1 between the matrix switches MSW3 and MSW4 of the channel 1, based on the result indicating that the second loop-back test has passed. After that, as illustrated in the test pattern 5, the control processor CNTL causes the CPU1 to conduct a first loop-back test in which test data is looped back at the matrix switch MSW5, using the channel 1. An example of the first loop-back test in which the test data is looped back at the matrix switch MSW5 is illustrated in FIG. 7B.

In this example, since a failure is occurring in the receiver RX of the channel 1 in the LSI2, the first loop-back test fails. When the first loop-back test has failed in which the test data is looped back at the matrix switch MSW5, the control processor CNTL reroutes one of the outward path and the return path between the matrix switches MSW4 and MSW5 of the channel 1 in which the communication error has been detected, to another channel. In this example, as illustrated in FIG. 7C, the outward path of the transmission path TP1 is rerouted. In addition, the control processor CNTL causes the CPU1 to conduct a second loop-back test in which test data is looped back at the matrix switch MSW5.

Since the second loop-back test is conducted while avoiding the outward path including the receiver RX of the channel 1 in the LSI2, the second loop-back test passes. The control processor CNTL determines that a failure has occurred in the outward path including the receiver RX between the matrix switches MSW4 and MSW5 of the channel 1 in the LSI2, based on the result indicating that the second loop-back test has passed. After that, as illustrated in the test pattern 6, the control processor CNTL causes the CPU1 to conduct a first loop-back test in which test data is looped back at the matrix switch MSW6 by using the channel 1. An example of the first loop-back test in which the test data is looped back at the matrix switch MSW6 is illustrated in FIG. 8A.

When the first loop-back test by the test pattern 6 has passed, as illustrated in the test pattern 7, the control processor CNTL causes the CPU1 to conduct a first loop-back test in which test data is looped back at the CPU2 by using the channel 1. An example of the first loop-back test in which the test data is looped back at the CPU2 is illustrated in FIG. 8B. In this case, the first loop-back test by the test pattern 7 passes. As a result, the control processor CNTL determines that a communication failure of the channel 1 has occurred due to the failure occurring in the outward path between the matrix switches MSW3 and MSW4 of the channel 1 and the failure occurring in the outward path between the matrix switches MSW4 and MSW5 of the channel 1 in the LSI2.

FIGS. 7A to 8B are diagrams illustrating an example of the loop-back test by the test patterns 4 to 7 illustrated in FIG. 6. The detailed description of an operation similar to that of FIGS. 2A to 3C is omitted herein. FIG. 7A is a diagram illustrating a state in which the second loop-back test is conducted while rerouting the outward path between the matrix switches MSW3 and MSW4 in the channel 1 to the channel 2 when the first loop-back test by the test pattern 4 illustrated in FIG. 6 has failed. In the second loop-back test, the failure is detected in the outward path between the matrix switches MSW3 and MSW4 in the channel 1 (that is, the outward path of the transmission path TP1).

FIG. 7B is a diagram illustrating a state in which the first loop-back test by the test pattern 5 illustrated in FIG. 6 fails. As illustrated in FIG. 7B, while maintaining the path that has been rerouted in the already-executed test patterns as is, the next loop-back test is conducted.

FIG. 7C is a diagram illustrating a state in which the second loop-back test is conducted while rerouting the outward path between the matrix switches MSW4 and MSW5 in the channel 1 to the channel 2 when the first loop-back test by the test pattern 5 has failed. In the second loop-back test, a failure is detected in the outward path between the matrix switches MSW4 and MSW5 of the channel 1 (that is, the receiver RX of the channel 1 in the LSI2).

FIG. 8A is a diagram illustrating a state in which the first loop-back test by the test pattern 6 illustrated in FIG. 6 is conducted. FIG. 8B is a diagram illustrating a state in which the first loop-back test by the test pattern 7 illustrated in FIG. 6 is conducted. As a result, the control processor CNTL determines that the failures have respectively occurred in the outward path between the matrix switches MSW3 and MSW4 in the channel 1 and the outward path between the matrix switches MSW4 and MSW5 in the channel 1, and ends the loop-back test.

FIG. 9 is a diagram illustrating an example of switching control information respectively indicating switching states of the matrix switches MSW when the first loop-back test illustrated in FIG. 8B has ended. Here, switching control information used to reroute the path are indicated by shaded areas. That is, as illustrated in the third row and the ninth row of the table, the terminal A of the matrix switch MSW3 of the channel 1 is coupled to the terminal C of the matrix switch MSW3 of the channel 2. As illustrated in the tenth row of the table, the terminal A and the terminal C of the matrix switch MSW4 of the channel 2 are coupled to each other. In addition, as illustrated in the 11th row and the fifth row of the table, the terminal A of the matrix switch MSW5 of the channel 2 is coupled to the terminal C of the matrix switch MSW5 of the channel 1.

FIGS. 10A to 11C are diagrams illustrating another example of the loop-back test executed by the control processor CNTL illustrated in FIG. 4. That is, FIGS. 10A to 11C are diagrams illustrating another example of the failure detection method of the information processing device. For example, the loop-back test illustrated in FIGS. 10A to 10C is conducted when failures have respectively occurred at two locations such as the return path of the transmission path TP1 of the channel 1 and the receiver RX of the channel 1 in the LSI2, and a communication error has occurred in the channel 1. Before the second loop-back test in FIG. 10A is conducted, the first loop-back tests by the test patterns 1 to 4 illustrated in FIG. 6 are conducted, and the first loop-back test by the test pattern 4 fails.

Similar to FIG. 7A, FIG. 10A is a diagram illustrating a state in which the outward path between the matrix switches MSW3 and MSW4 of the channel 1 where a communication error has been detected is rerouted to the channel 2. The control processor CNTL causes the CPU1 to conduct a second loop-back test in which test data is looped back at the matrix switch MSW4. However, since there is a failure occurring in the return path of the transmission path TP1, the second loop-back test fails.

When the second loop-back test has failed, as illustrated in FIG. 10B, the control processor CNTL reroutes the return path between the matrix switches MSW3 and MSW4 of the channel 1, to the channel 2. Then, the control processor CNTL causes the CPU1 to conduct a third loop-back test in which test data is looped back at the matrix switch MSW4. Since the third loop-back test is executed while rerouting the return path of the transmission path TP1 of the channel 1, the third loop-back test passes. The control processor CNTL determines that a failure has occurred in the return path between the matrix switches MSW3 and MSW4 of the channel 1, based on the result indicating that the third loop-back test has passed.

Next, similar to FIG. 7B, as illustrated in FIG. 10C, the control processor CNTL causes the CPU1 to conduct a first loop-back test in which test data is looped back at the matrix switch MSW5 by using the channel 1. The first loop-back test fails due to a failure in the receiver RX of the channel 1 in the LSI2.

Figures 11A, 11B, 11C:
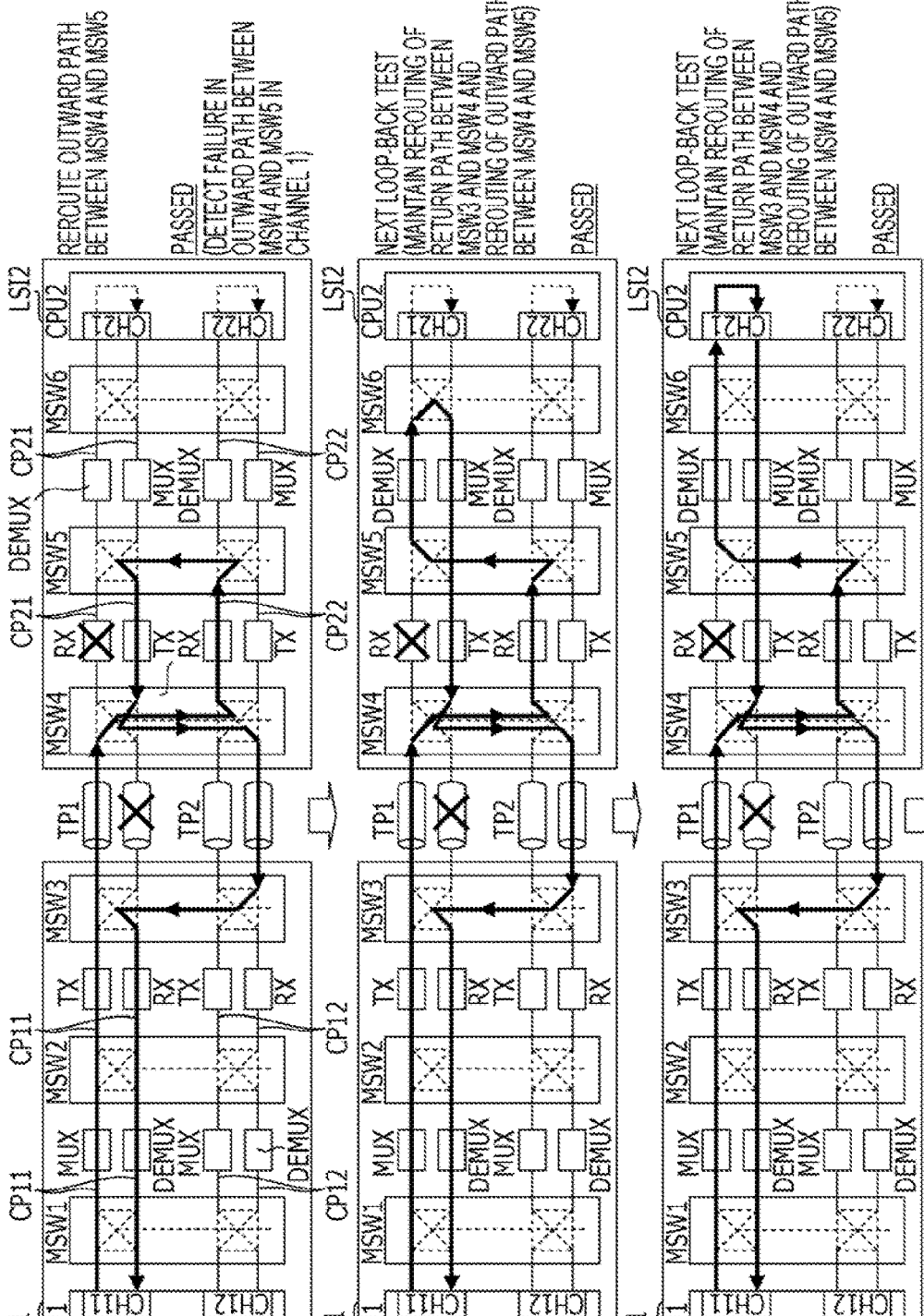
FIGS. 11A to 11C are diagrams illustrating an example of a loop-back test executed by a control processor, according to an embodiment.

Next, similar to FIG. 7C, as illustrated in FIG. 11A, the control processor CNTL reroutes the outward path between the matrix switches MSW4 and MSW5 of the channel 1 in which the communication error has been detected, to the channel 2. Then, the control processor CNTL causes the CPU1 to conduct a second loop-back test in which test data is looped back at the matrix switch MSW5. The second loop-back test passes.

Next, similar to FIG. 8A, in FIG. 11B, the control processor CNTL causes the CPU1 to conduct a first loop-back test in which test data is looped back at the matrix switch MSW6. The first loop-back test passes. In addition, similar to FIG. 8B, in FIG. 11C, the control processor CNTL causes the CPU1 to conduct a first loop-back test in which test data is looped back at the CPU2. The first loop-back test passes. As a result, the control processor CNTL determines that failures have respectively occurred in the return path between the matrix switches MSW3 and MSW4 in the channel 1 and the outward path between the matrix switches MSW4 and MSW5 in the channel 1, and ends the loop-back test.

FIG. 12 is a diagram illustrating an example of switching control information indicating switching states of the matrix switches MSW when the first loop-back test illustrated in FIG. 11C has ended.

Here, switching control information used to reroute the outward path between the matrix switches MSW4 and MSW5 in the channel 1 to the channel 2 are indicated by shaded areas. That is, as illustrated in the fourth row and the tenth row of the table, the terminal A of the matrix switch MSW4 of the channel 1 is coupled to the terminal C of the matrix switch MSW4 of the channel 2. In addition, as illustrated in the 11th row and the fifth row of the table, the terminal A of the matrix switch MSW5 of the channel 2 is coupled to the terminal C of the matrix switch MSW5 of the channel 1.

Switching control information used to reroute the return path between the matrix switches MSW3 and MSW4 in the channel 1 to the channel 2 are indicated by bold frames. That is, as illustrated in the fourth row and the tenth row of the table, the terminal D of the matrix switch MSW4 of the channel 1 is coupled to the terminal B of the matrix switch MSW4 of the channel 2. In addition, as illustrated in the ninth row and the third row of the table, the terminal D of the matrix switch MSW3 of the channel 2 is coupled to the terminal B of the matrix switch MSW3 of the channel 1.

FIGS. 13A to 14C are diagrams illustrating another example of the loop-back test executed by the control processor CNTL illustrated in FIG. 4. That is, FIGS. 13A to 14C are diagrams illustrating another example of the failure detection method of the information processing device. For example, the loop-back test illustrated in FIGS. 13A to 14C is conducted when failures have respectively occurred in three parts of the outward path and the return path of the transmission path TP1 in the channel 1, and the receiver RX in the channel 1 in the LSI2, and a communication error has occurred in the channel 1. Similar to FIG. 10A, before the second loop-back test in FIG. 13A is conducted, the first loop-back tests by the test patterns 1 to 4 illustrated in FIG. 6 are conducted, and the first loop-back test by test pattern 4 fails.

Similar to FIG. 7A, FIG. 13A is a diagram illustrating a state in which the outward path between the matrix switches MSW3 and MSW4 in the channel 1 is rerouted to the channel 2. The control processor CNTL causes the CPU1 to conduct a second loop-back test in which test data is looped back at the matrix switch MSW4. However, since there is a failure occurring in the return path of the transmission path TP1, the second loop-back test fails.

When the second loop-back test has failed, similar to FIG. 10B, as illustrated in FIG. 13B, the control processor CNTL reroutes the return path between the matrix switches MSW3 and MSW4 of the channel 1 to the channel 2. In addition, the control processor CNTL causes the CPU1 to conduct a third loop-back test in which test data is looped back at the matrix switch MSW4. However, since there is a failure occurring in the outward path of the transmission path TP1, the third loop-back test fails. As a result, the control processor CNTL determines that failures have respectively occurred in the outward path and the return path between the matrix switches MSW3 and MSW4 in the channel 1, based on the result indicating that the second loop-back test and the third loop-back test have failed.

Next, as illustrated in FIG. 13C, the control processor CNTL reroutes the outward path and the return path between the matrix switches MSW3 and MSW4 in the channel 1, and causes the CPU1 to conduct a first loop-back test in which test data is looped back at the matrix switch MSW5. The first loop-back test fails due to a failure in the receiver RX of the channel 1 in the LSI2.

Next, similar to FIG. 7C, as illustrated in FIG. 14A, the control processor CNTL reroutes the outward path between the matrix switches MSW4 and MSW5 of the channel 1 in which the communication error has been detected, to the channel 2. Then, the control processor CNTL causes the CPU1 to conduct a second loop-back test in which test data is looped back at the matrix switch MSW5. The second loop-back test passes.

Next, similar to FIG. 8A, in FIG. 14B, the control processor CNTL causes the CPU1 to conduct a first loop-back test in which test data is looped back at the matrix switch MSW6. The first loop-back test passes. In addition, similar to FIG. 8B, in FIG. 14C, the control processor CNTL causes the CPU1 to conduct a first loop-back test in which test data is looped back at the CPU2. The first loop-back test passes. As a result, the control processor CNTL determines that failures have respectively occurred in the outward path and the return path between the matrix switches MSW3 and MSW4 in the channel 1 and the outward path between the matrix switches MSW4 and MSW5 in the channel 1.

Figure 15:
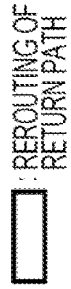
FIG. 15 is a diagram illustrating an example of switching control information indicating switching states of matrix switches when a first loop-back test has ended, according to an embodiment.

FIG. 15 is a diagram illustrating an example of switching control information indicating switching states of the matrix switches MSW when the first loop-back test illustrated in FIG. 14C has ended. Here, switching control information used to reroute the outward path between the matrix switches MSW3 and MSW5 in the channel 1 to the channel 2 are indicated by shaded areas. In addition, switching control information used to reroute the return path between the matrix switches MSW3 and MSW4 in the channel 1 to the channel 2 are indicated by bold frames.

Figure 16:
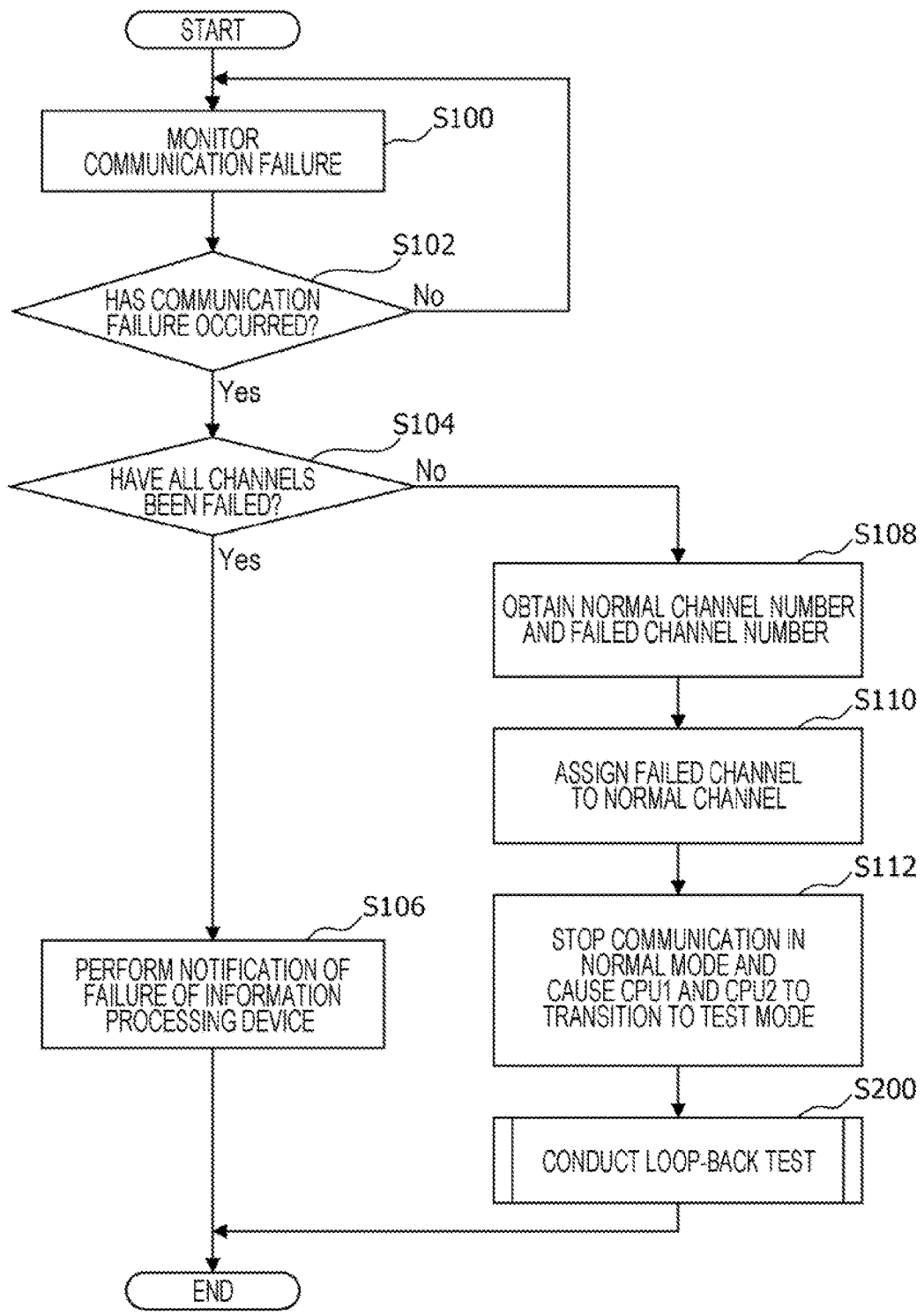
FIG. 16 is a diagram illustrating an example of an operational flowchart for a monitoring operation of a communication state, which is executed by a control processor, according to an embodiment.

FIG. 16 is a diagram illustrating an example of a monitoring operation of a communication state between the CPUs 1 and 2, which is controlled by the control processor CNTL illustrated in FIG. 4.

First, in Step S100, the control processor CNTL monitors a communication failure that occurs between the CPUs 1 and 2. The monitoring in Step S100 is executed during the normal mode in which normal communication is performed between the CPUs 1 and 2. The control processor CNTL monitors a communication failure based on the presence or absence of reception of an error notification from the CPU1 or 2, which indicates that a communication error has occurred. Next, in Step S102, in the control processor CNTL, the processing proceeds to Step S104 when a communication failure has occurred, and the processing returns to Step S100 when a communication failure does not occur, and the monitoring is continued.

In Step S104, the control processor CNTL determines whether communication failures have respectively occurred in all channels. In the control processor CNTL, the processing proceeds to Step S106 when the control processor CNTL determines that communication failures have respectively occurred in all of the channels. In the control processor CNTL, the processing proceeds to Step S108 when communication failures have respectively occurred in some of the channels, that is, when there is a channel that is operating normally.

In Step S106, since communication failures have respectively occurred in all of the channels, the control processor CNTL determines that the information processing device IPE2 has failed, and notifies a management device or the like that manages the information processing device IPE2 of the failure in the information processing device IPE2. The control processor CNTL may display information indicating that the information processing device IPE2 has failed on a screen of the management device or the like.

On the other hand, in Step S108, the control processor CNTL obtains a number assigned to the channel that is operating normally and a number assigned to the channel in which a failure has occurred. Next, in Step S110, the control processor CNTL allocates each of the channels in which failures have respectively occurred to any one of the channels that are respectively operating normally. At this time, the plurality of failed channels may be allocated to the plurality of channels that are respectively operating normally or may be allocated, in common, to a single channel that is operating normally. When the plurality of channels in which failures have respectively occurred are allocated to the plurality of channels that are respectively operating normally, loop-back tests of the plurality of failed channels (FIG. 6) may be conducted in parallel. When the plurality of failed channels is allocated, in common, to the single channel that is operating normally, communication in the normal mode may be performed during the loop-back test by using another channel that is operating normally.

Next, in Step S112, the control processor CNTL stops the communication in the normal mode of a channel used for the loop-back test, and issues an instruction to cause the mode to transition to the test mode, to the CPUs 1 and CPU2. The CPUs 1 and 2 cause the mode of the instructed channel to transition from the normal mode to the test mode. Next, in Step S200, the control processor CNTL conducts the loop-back test illustrated in FIG. 6, and ends the processing.

Figure 17:
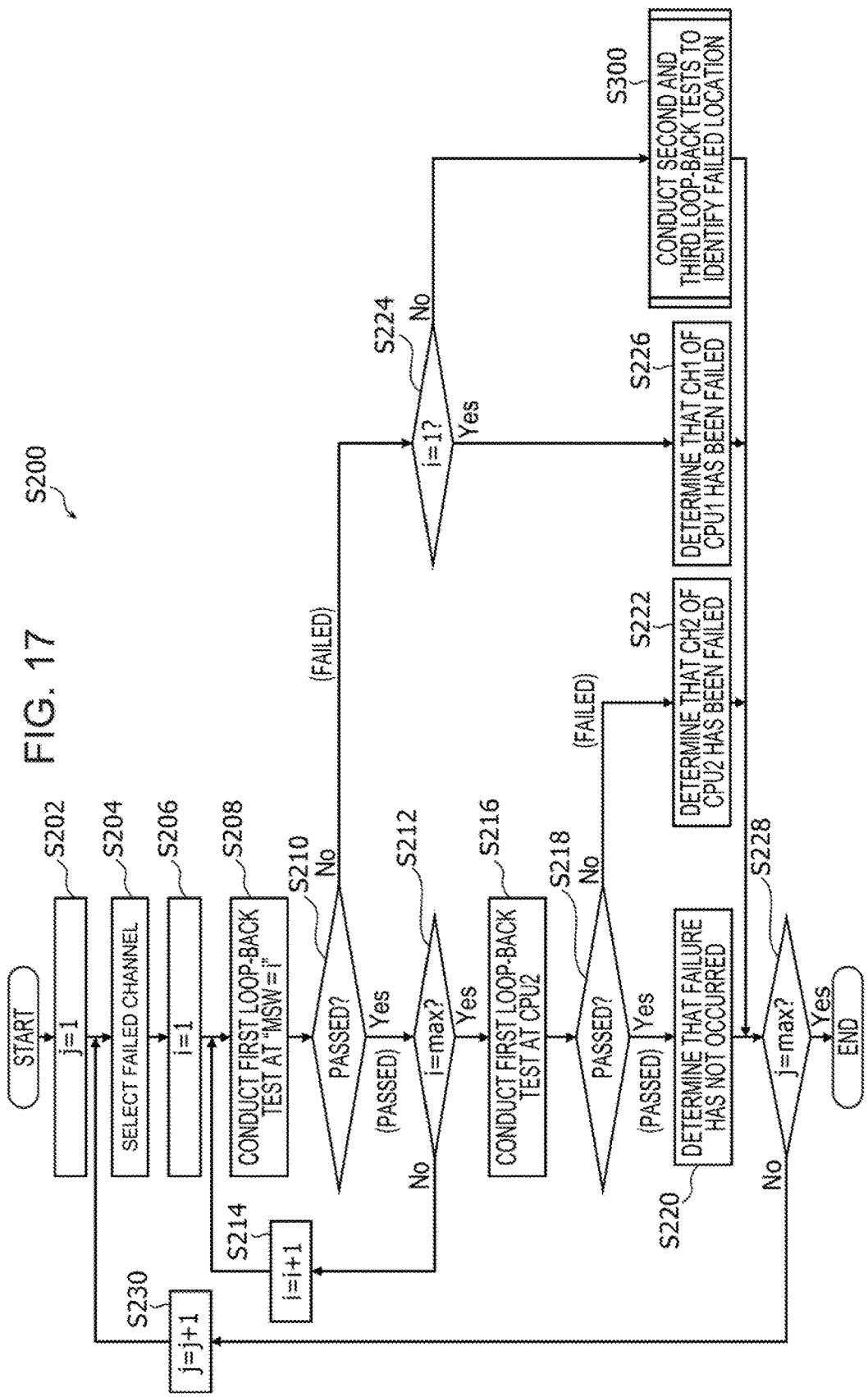
FIG. 17 is a diagram illustrating an example of an operational flowchart for a loop-back test, according to an embodiment.

FIG. 17 is a diagram illustrating an example of the loop-back test illustrated in Step S200 of FIG. 16. That is, FIG. 17 is a diagram illustrating an example of the failure detection method of the information processing device. In FIG. 17, a variable i indicates a number assigned to a matrix switch MSW at which test data is looped back in the first loop-back test, and a variable j indicates the number of channels in which failures have respectively occurred. In the example illustrated in FIG. 4, the maximum value of the variable i is "6" that is the number of the matrix switches MSW1 to MSW6, and the maximum value of the variable j is "7" that is less than the number of channels (="8") included in the information processing device IPE2 by 1. For example, the control processor CNTL assigns a failed channel number to a channel in which a failure has occurred in order from "1".

First, in Step S202, the control processor CNTL initializes the variable j at "1". Next, in Step S204, the control processor CNTL selects a failed channel corresponding to the variable j. Next, in Step S206, the control processor CNTL initializes the variable i at "1", and the processing proceeds to Step S208. The processing of Step S208 and subsequent steps are executed for the failed channel that has been selected in Step S204.

In Step S208, the control processor CNTL conducts a first loop-back test in which test data is looped back at a matrix switch MSWi. Next, in Step S210, the control processor CNTL determines pass/failure of the first loop-back test, and the processing proceeds to Step S212 when the first loop-back test has passed, and the processing proceeds to Step S224 when the first loop-back test has failed.

In Step S212, the control processor CNTL determines whether the number assigned to the matrix switch MSW at which the test data has been looped backed is the maximum value of the variable i. When the number assigned to the matrix switch MSW at which the test data has been looped back is not the maximum value of the variable i, a first loop-back test using the matrix switch MSW is yet to be completed, so that the processing proceeds to Step S214. When the number of the matrix switch MSW at which the test data has been looped back is the maximum value of the variable i, the first loop-back test using matrix switch MSW has been completed, so that the processing proceeds to Step S216.

In Step S214, the control processor CNTL increases the variable i by "1" in order to conduct a first loop-back test in which test data is looped back at the next matrix switch MSW, and the processing proceeds to Step S208. On the other hand, in Step S216, the control processor CNTL controls the CPU2 illustrated in FIG. 4 and conducts a first loop-back test in which test data is looped back at the CPU2.

Next, in Step S218, the control processor CNTL determines pass/failure of the first loop-back test in which the test data is looped back at the CPU2, and the processing proceeds to Step S220 when the first loop-back test has passed, and the processing proceeds to Step S222 when the first loop-back test has failed. In Step S220, the control processor CNTL determines that a failure has not occurred between the CPUs 1 and 2, and the processing proceeds to Step S228 because the first loop-back test has been conducted successfully. That is, the communication failure that has been determined in Step S102 of FIG. 16 is determined to have temporarily occurred due to a noise or the like. In Step S222, the control processor CNTL determines that a failure has occurred in the communication interface unit CH2 of the CPU2 in the failed channel, and the processing proceeds to Step S228.

On the other hand, when the first loop-back test in Step S208 has failed, in Step S224, the control processor CNTL determines whether the variable i is "1". The processing proceeds to Step S226 when the variable i is "1", and the processing proceeds to Step S300 when the variable i is not "1". In Step S226, the control processor CNTL determines that a failure has occurred in the communication interface unit CH1 of the CPU1 in the failed channel. In this case, since it is difficult to continue the loop-back test of the failed channel, the processing proceeds to Step S228. In Step S300, the control processor CNTL conducts a loop-back test used to identify a failure location. An example of the processing of Step S300 is illustrated in FIG. 18.

In Step S228, the control processor CNTL determines whether there is a channel for which a loop-back test is yet to be conducted, from among the failed channels, using the variable j. When the variable j is the maximum value, a loop-back test has been completed for all of the failed channels, so that the processing ends. When the variable j is not the maximum value, there is a channel for which the loop-back test is yet to be conducted, so that the processing proceeds to Step S230. In Step S230, the control processor CNTL increases the variable j by "1" in order to conduct a loop-back test for another failed channel, and the processing proceeds to Step S204.

Figure 18:
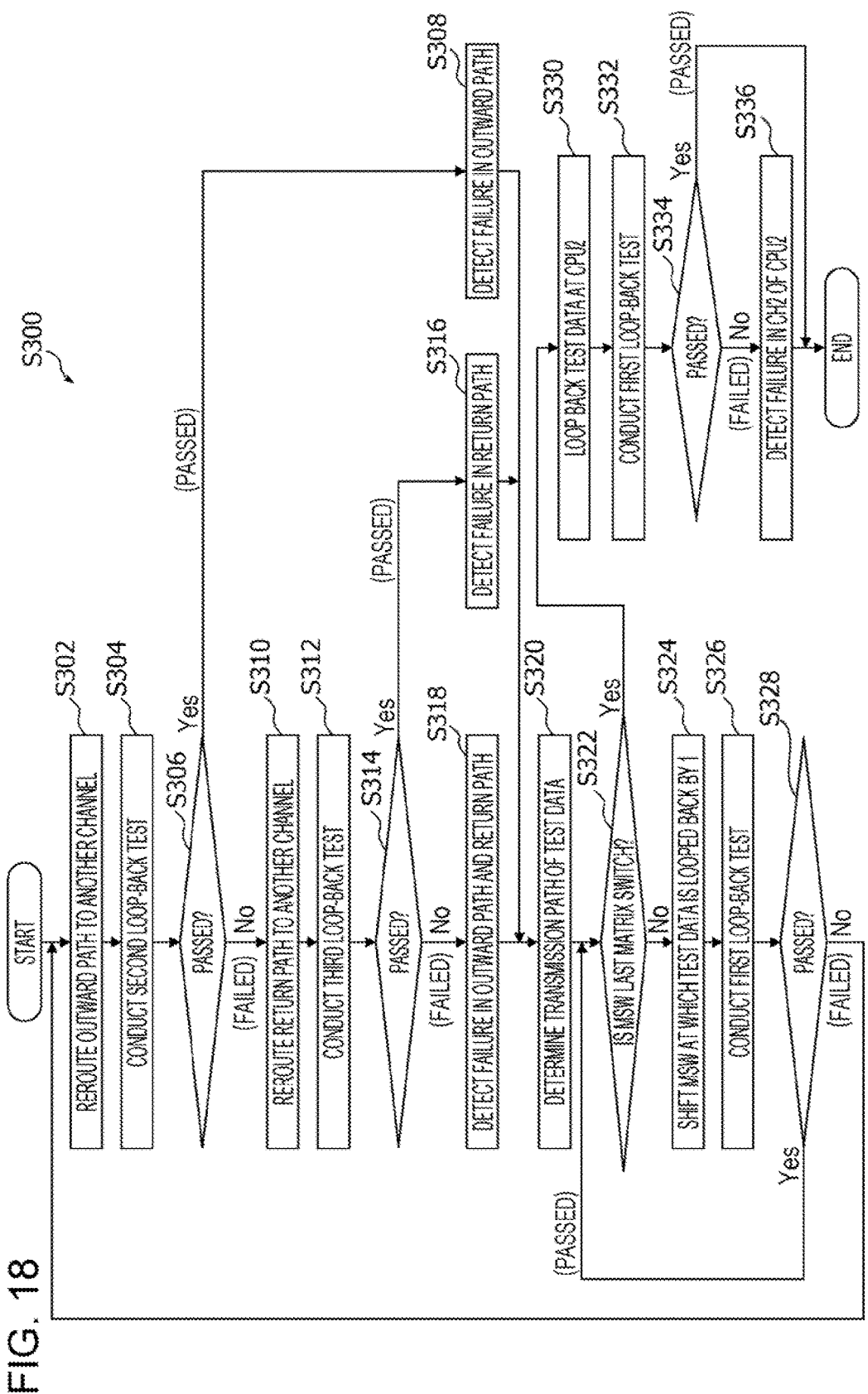
FIG. 18 is a diagram illustrating an example of an operational flowchart for a loop-back test in which a failure location is identified, according to an embodiment.

FIG. 18 is a diagram illustrating an example of the loop-back test used to identify a failure location in Step S300 illustrated in FIG. 17. FIG. 18 is a diagram illustrating a loop-back test conducted after the first failure from among a plurality of loop back tests conducted in a channel in which a failure has been detected. A first loop-back test before the first failure is conducted in Step S208 illustrated in FIG. 17. For example, in FIG. 6, up to a first loop-back test in which test data is looped back at the matrix switch MSW4, the loop-back tests are conducted in Step S208 of FIG. 17, and subsequent loop-back tests are executed in Step S300.

First, in Step S302, the control processor CNTL reroutes the outward path between a matrix switch MSW at which test data is looped back and a matrix switch MSW that is located one before the matrix switch MSW at which the test data is looped back, to another channel. In the following description, the matrix switch MSW at which the test data is looped back is also referred to as a loop-back switch MSW. Next, in Step S304, the control processor CNTL conducts a second loop-back test in which test data is looped back at the loop-back switch MSW in a state in which the outward path has been rerouted.

Next, in Step S306, in the control processor CNTL, the processing proceeds to Step S308 when the second loop-back test has passed, and the processing proceeds to Step S310 when the second loop-back test has failed. In Step S308, the control processor CNTL detects a failure occurring in the outward path, and the processing proceeds to Step S320 because the communication error has been resolved due to the rerouting of the outward path.

In Step S310, the control processor CNTL reroutes the return path between the loop-back switch MSW and a matrix switch MSW that is located one before the loop-back switch MSW, to another channel. Next, in Step S312, the control processor CNTL conducts a third loop-back test in which test data is looped back at the loop-back switch MSW in the state in which the return path has been rerouted. Next, in Step S314, in the control processor CNTL, the processing proceeds to Step S316 when the third loop-back test has passed, and the processing proceeds to Step S318 when the third loop-back test has failed.

In Step S316, since the communication error has been resolved due to the rerouting of the return path, the control processor CNTL detects a failure occurring in the return path, and the processing proceeds to Step S320. In Step S318, since the communication error is not resolved by the rerouting of the outward path or the rerouting of the return path, the control processor CNTL determines that failures have respectively occurred in both of the outward path and het return path, and the processing proceeds to Step S320.

In Step S320, the control processor CNTL determines a path through which test data is to be transmitted, based on the result of the loop-back test that has been conducted so far. That is, a bypass route is determined depending on the state of a failure in the outward path and the return path. Next, in Step S322, in a manner similar to Step S212 illustrated in FIG. 17, the control processor CNTL determines whether the matrix switch MSW at which the test data has been looped back is the last matrix switch. When the matrix switch MSW is the last matrix switch, the processing proceeds to Step S330, and when the matrix switch MSW is not the last matrix switch, the processing proceeds to Step S324.

In Step S324, the control processor CNTL shifts the loop-back switch MSW to a matrix switch MSW located on the far side from CPU1 that performs output of test data, by 1. Next, in Step S326, the control processor CNTL conducts a first loop-back test in which test data is looped back at the loop-back switch MSW. Next, in Step S328, in the control processor CNTL, when the first loop-back test has passed, the processing proceeds to Step S322 in order to conduct a first loop-back test in the next loop-back switch MSW. In the control processor CNTL, when the first loop-back test has failed, the processing proceeds to Step S302 in order to identify a failure location.

In addition, in Step S330, since the loop-back test in the last matrix switch MSW has been conducted, the control processor CNTL instructs the CPU2 illustrated in FIG. 4 to perform loop-back of test data. Next, in Step S332, the control processor CNTL conducts a first loop-back test in which test data is looped back in the CPU2. Next, in Step S334, the control processor CNTL determines pass/failure of the loop-back test in which the test data is looped back at the CPU2, and when the loop-back test has passed, the processing ends, and when the loop-back test has failed, the processing proceeds to Step S336. In Step S336, the control processor CNTL determines that the communication interface unit CH2 of the CPU2 in the failed channel has failed, and the processing ends.

As described above, even in the embodiment illustrated in FIGS. 4 to 18, an effect similar to that of the embodiment illustrated in FIGS. 1 to 3 may be obtained. That is, locations of a plurality of failures that have occurred in the communication paths CP1 and CP2 and the transmission path TP may be identified. In addition, the locations of the plurality of failures that have occurred in the communication paths CP1 and CP2 and the transmission path TP may be identified without the intervene of the maintenance worker or the like. As a result, as compared with a case in which the failure locations are identified by the maintenance worker or the like, the failures may be restored quickly, and the reliability of the information processing device IPE2 may be improved. When at least a single channel is operating normally, a failure location of another channel may be identified.

In addition, in the embodiment illustrated in FIGS. 4 to 18, the following effect may be obtained. That is, when the communication processors such as the multiplexer MUX, the transmitter TX, the receiver RX, and the like are provided between matrix switches MSW, a failure in each of the communication paths CP1 and CP2 including the communication processors may be detected by a loop-back test.

Figure 19:
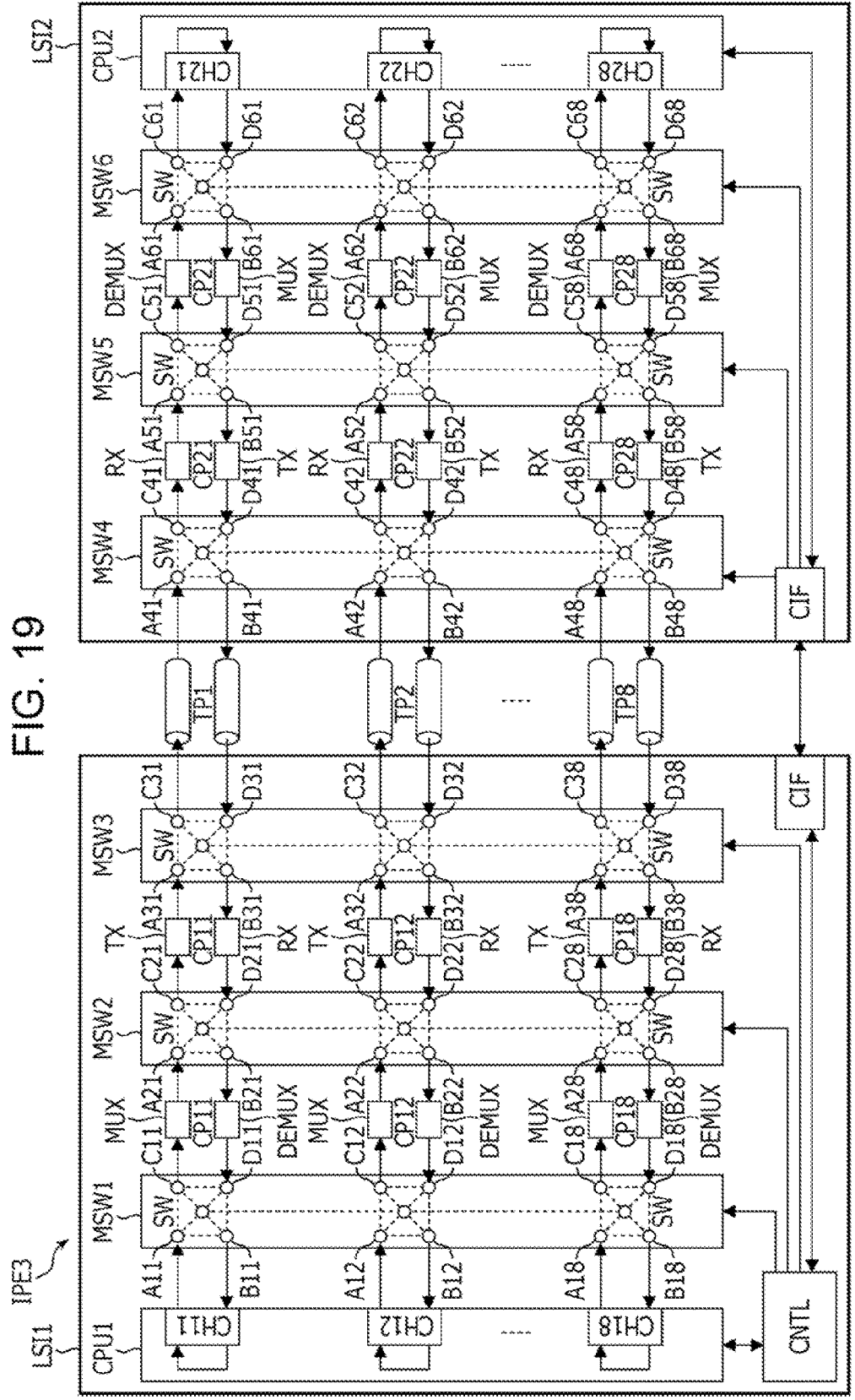
FIG. 19 is a diagram illustrating an example of an information processing device, according to an embodiment.

FIG. 19 is a diagram illustrating an information processing device according to another embodiment. The same symbol is assigned to an element that is the same as or similar to the element described with reference to FIGS. 1 and 4, and the detailed description thereof is omitted herein. In an information processing device IPE3 according to this embodiment, a control processor CNTL is provided in an LSI1. Each of the LSI1 and an LSI2 includes a control interface unit CIF. Transmission of switching control information from the control processor CNTL to the matrix switches MSW4, MSW5, and MSW6 of the LSI2 and transmission and reception of test control information between the control processor CNTL and the CPU2 are performed through the control interface units CIF. The other configuration of the information processing device IPE3 is the same as the configuration of the information processing device IPE2 illustrated in FIG. 4. A monitoring operation of a communication failure and an operation of a loop-back test in a channel, which are performed by the control processor CNTL, are the same as the operations in FIGS. 6 to 18.

Even in the embodiment illustrated in FIG. 19, an effect similar to that of the embodiment illustrated in FIGS. 1 to 18 may be obtained. In addition, in the embodiment illustrated in FIG. 19, due to the provision of the control processor CNTL in the LSI1, the number of wires provided in a substrate on which the LSI1 is mounted is reduced as compared with FIG. 4. In addition, due to the provision of the respective control interface unit CIF used to perform transmission of switching control information and test control information in the LSI1 and the LSI2, the number of wires provided in a substrate on which the LSI2 is mounted may be reduced as compared with FIG. 4. As a result, the number of terminals provided in the LSI1 and the LSI2 may be reduced as compared with FIG. 4. In addition, the number of wires each of which couples the substrate on which the LSI1 is mounted to the substrate on which the LSI2 is mounted is reduced as compared with FIG. 4. That is, the number of terminals and the number of wires in the backplane may be reduced as compared with FIG. 4.

Figure 20:
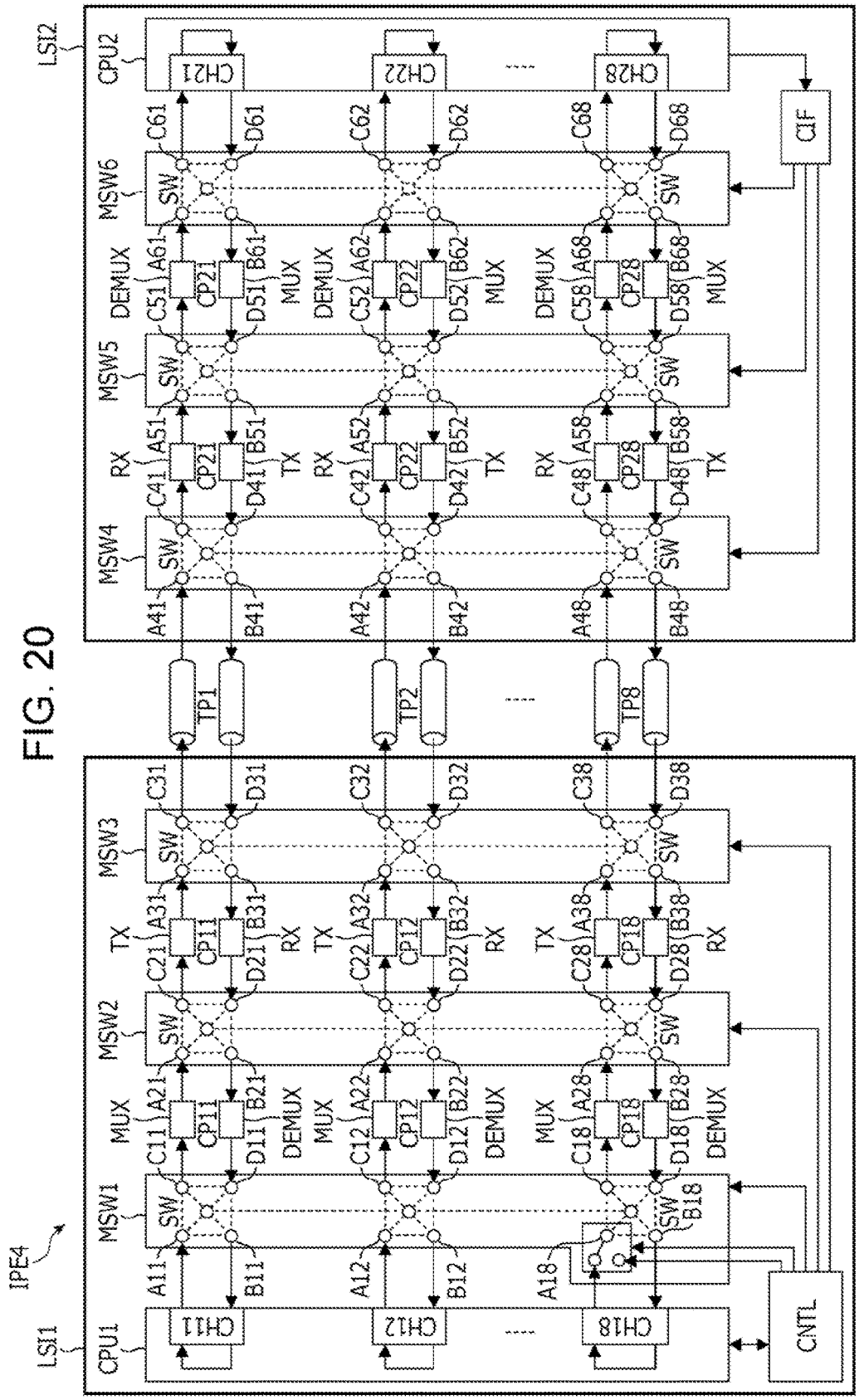
FIG. 20 is a diagram illustrating an example of an information processing device, according to an embodiment.

FIG. 20 is a diagram illustrating an information processing device according to another embodiment. The same symbol is assigned to an element that is the same as or similar to the element described with reference to FIGS. 1 and 4, and the detailed description thereof is omitted herein. In an information processing device IPE4 according to this embodiment, a control processor CNTL provided in an LSI1 transmits switching control information to the matrix switches MSW4, MSW5, and MSW6 and transmits test control information to the CPU2 of the LSI2, using a channel. In FIG. 20, the switching control information and the test control information are transmitted to the LSI2 using a channel 8. The other configuration of the information processing device IPE4 is the same as the configuration of the information processing device IPE2 illustrated in FIG. 4. A monitoring operation of a communication failure and an operation of a loop-back test in a channel, which are performed by the control processor CNTL, are the same as the operations in FIGS. 6 to 18.

To a terminal A18 of the channel 8, a selector SEL that couples one of the communication interface unit CH18 and the control processor CNTL to the terminal A18 is coupled. The control processor CNTL couples the terminal A18 to the communication interface unit CH18 through the selector SEL, during the normal mode, and couples the terminal A18 to the control processor CNTL through the selector SEL, during the test mode. As a result, during the test mode, switching control information used to respectively perform switching in the matrix switches MSW4, MSW5, and MSW6 may be transmitted to the LSI2 using the channel 8, and test control information may be transmitted to the CPU2.

A communication interface unit CH28 that has received the switching control information from the control processor CNTL through the channel 8 during the test mode respectively transfers the switching control information to the matrix switches MSW4, MSW5, and MSW6 through the control interface unit CIF. In addition, the communication interface unit CH28 that has received the test control information from the control processor CNTL through the channel 8 during the test mode issues an instruction to cause test data to be looped back to any one of the communication interface units CH21 to CH28.

In order to allow a loop-back test to be conducted even when one of a plurality of channels fails, it is desirable that a selector SEL is coupled to each terminal A of the matrix switch MSW1. In addition, when the control processor CNTL receives information from the CPU2 during the test mode, the selector SEL is also coupled to each terminal B of the matrix switch MSW1.

Even in the embodiment illustrated in FIG. 20, an effect similar to that of the embodiment illustrated in FIGS. 1 to 18 may be obtained. In addition, in the embodiment illustrated in FIG. 20, the following effect may be obtained. That is, the number of terminals provided in the LSI1 and the LSI2 may be reduced as compared with FIG. 19, and the number of wires provided in a substrate on which the LSI1 is mounted and the number of wires provided in a substrate on which the LSI2 is mounted may be reduced as compared with FIG. 19. In addition, the number of wires each of which couples the substrate on which the LSI1 is mounted to the substrate on which the LSI2 is mounted may be reduced as compared with FIG. 19. That is, the number of terminals and the number of wires in the backplane may be reduced as compared with FIG. 19.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:
   a first communication circuit including a first processor;
   a second communication circuit including a second processor; and
   a third processor, wherein
   the first processor of the first communication circuit and the second processor of the second communication circuit are configured to transmit and receive information to and from each other through a plurality of first communication paths,
   each of the first communication circuit and the second communication circuit including:
      a plurality of second communication paths respectively coupled to the plurality of first communication paths, and
      a plurality of matrix switches that are provided across the plurality of second communication paths and switch a transmission path of information transmitted to any one of the plurality of second communication paths; and
   the third processor is configured to:
      when a communication error is detected in the plurality of second communication paths, conduct a first loop-back test that is a test in which each of the plurality of matrix switches is switched to a loop-back state in which information to be transmitted to one of the plurality of second communication paths in which the communication error has been detected, is looped back, and
      when an error is detected in the first loop-back test, switch the plurality of matrix switches to a bypass state in which one of the plurality of second communication paths in which the error is detected is bypassed to another one of the plurality of second communication paths, and conduct a second loop-back test by rerouting a first path that is one of an outward path and a return path for an error-detected communication path of the plurality of second communication paths in which the error has been detected, to a first alternative communication path of the plurality of second communication paths other than the error-detected communication path,
      when an error is not detected in the second loop-back test, make a determination that a failure is occurring at the first path of the error-detected communication path, and when an error is detected in the second loop-back test, conduct a third loop-back test by rerouting a second path that is the other one of the outward path and the return path for the error-detected communication path, to a second alternative communication path of the plurality of second communication paths other than the error-detected communication path and the first alternative communication path,
      when an error is not detected in the third loop-back test, make a determination that a failure is occurring at the second path of the error-detected communication path, and when an error is detected in the third loop-back test, make a determination that a failure is occurring at both of the first path and the second path of the error-detected communication path, and
      continue the first loop-back test by avoiding the path at which a determination of a failure occurrence has been made.

2. The apparatus of claim 1, wherein the third processor is provided in the first communication circuit.

3. The apparatus of claim 2, wherein the third processor is configured to transmit control information used to control the plurality of matrix switches of the second communication circuit, to the second communication circuit, by using one of the plurality of second communication paths.

4. The apparatus of claim 1, wherein each of the first communication circuit and the second communication circuit includes a communication processor that is provided between mutually adjacent two matrix switches of the plurality of matrix switches, and that executes transmission processing or reception processing of information.

5. The apparatus of claim 1, wherein
   each of the first processor of the first communication circuit and the second processor of the second communication circuit that transmits information to the plurality of second communication paths and receives information from the plurality of second communication paths; and
   the third processor is configured to, when a communication error is detected in any one of the plurality of second communication paths, cause one of the first processor and the second processor to output test data, and to detect an error in the first loop-back test, based on the test data looped back at any one of the plurality of matrix switches.

6. The apparatus of claim 1, wherein
   the first communication circuit and the second communication circuit are respectively mounted on substrates mounted on a rack; and
   the plurality of first communication paths is included in a backplane that is provided in the rack, and to which the substrates are coupled.

7. A method performed by an apparatus that includes a first communication circuit and a second communication circuit that transmit and receive information to and from each other through a plurality of first communication paths, each of the first communication circuit and the second communication circuit including a plurality of second communication paths respectively coupled to the plurality of first communication paths, and a plurality of matrix switches that are provided across the plurality of second communication paths and switch a transmission path of information transmitted to any one of the plurality of second communication paths, the method comprising:
   when a communication error is detected in the plurality of second communication paths, conducting a first loop-back test that is a test in which each of the plurality of matrix switches is switched to a loop-back state in which information to be transmitted to one of the plurality of second communication paths in which the communication error has been detected, is looped back; and
   when an error is detected in the first loop-back test, switching the plurality of matrix switches to a bypass state in which one of the plurality of second communication paths in which the error is detected is bypassed to another one of the plurality of second communication paths, and conducting a second loop-back test by rerouting a first path that is one of an outward path and a return path for an error-detected communication path of the plurality of second communication paths in which the error has been detected, to a first alternative communication path of the plurality of second communication paths other than the error-detected communication path;

when an error is not detected in the second loop-back test, making a determination that a failure is occurring at the first path of the error-detected communication path, and when an error is detected in the second loop-back test, conducting a third loop-back test by rerouting a second path that is the other one of the outward path and the return path for the error-detected communication path, to a second alternative communication path of the plurality of second communication paths other than the error-detected communication path and the first alternative communication path;

when an error is not detected in the third loop-back test, making a determination that a failure is occurring at the second path of the error-detected communication path, and when an error is detected in the third loop-back test, making a determination that a failure is occurring at both of the first path and the second path of the error-detected communication path; and continuing the first loop-back test by avoiding the path at which a determination of a failure occurrence has been made.

* * * * *